US012690046B2

(12) United States Patent
Lin et al.

(10) Patent No.: US 12,690,046 B2
(45) Date of Patent: Jul. 21, 2026

(54) METHOD AND APPARATUS FOR CONFIGURED GRANT BASED TRANSMISSION

(71) Applicant: Telefonaktiebolaget LM Ericsson (publ), Stockholm (SE)

(72) Inventors: Zhipeng Lin, Nanjing (CN); Jingya Li, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 350 days.

(21) Appl. No.: 18/270,827

(22) PCT Filed: Dec. 31, 2021

(86) PCT No.: PCT/CN2021/143793
§ 371 (c)(1),
(2) Date: Jul. 3, 2023

(87) PCT Pub. No.: WO2022/143997
PCT Pub. Date: Jul. 7, 2022

(65) Prior Publication Data
US 2024/0064756 A1      Feb. 22, 2024

(30) Foreign Application Priority Data
Jan. 4, 2021    (WO) ................ PCT/CN2021/070174

(51) Int. Cl.
*H04W 8/24*        (2009.01)
*H04L 1/1812*      (2023.01)
(Continued)

(52) U.S. Cl.
CPC ........... *H04W 72/23* (2023.01); *H04L 5/0048* (2013.01); *H04W 48/10* (2013.01)

(58) Field of Classification Search
None
See application file for complete search history.

(56) References Cited

U.S. PATENT DOCUMENTS

2021/0029704 A1*  1/2021  Zhou ................... H04W 72/541
2022/0022247 A1*  1/2022  Agiwal ............. H04W 72/0453
(Continued)

FOREIGN PATENT DOCUMENTS

CN      110536438 A      12/2019
CN      111757503 A      10/2020
WO      2020/144775 A1    7/2020

OTHER PUBLICATIONS

International Search Report and the Written Opinion of the International Searching Authority, issued in corresponding International Application No. PCT/CN2021/143793, dated Apr. 19, 2022, 17 pages.
(Continued)

*Primary Examiner* — Sithu Ko
(74) *Attorney, Agent, or Firm* — Rothwell, Figg, Ernst & Manbeck, P.C.

(57) ABSTRACT
Embodiments of the present disclosure provide methods, apparatus, and computer program products for configured grant (CG)-based transmission. A method comprises: determining one or more synchronization signal and physical broadcast channel blocks (SSBs); determining one or more physical uplink shared channel (PUSCH) resources mapped to the determined one or more SSBs in an association period, according to mapping information on mappings between a set of SSBs and a set of PUSCH resources; and transmitting to a network node, data of the CG based transmission by utilizing the determined one or more PUSCH resources. The association period is a time period in which all SSBs in the set of SSBs are mapped at least once to respective PUSCH resources.

19 Claims, 15 Drawing Sheets

4 PUSCH occasions per CG period,
4 SSBs,
1 SSBs per PUSCH occasion.

⊞ = PUSCH occasion map to SSB n

Time/frequency of first PUSCH occasion

One CG period

The pattern then repeats ...

SSB to PUSCH association period = CG period

(51) Int. Cl.
| | |
|---|---|
| *H04L 5/00* | (2006.01) |
| *H04W 48/10* | (2009.01) |
| *H04W 72/23* | (2023.01) |

(56) References Cited

U.S. PATENT DOCUMENTS

| | | | |
|---|---|---|---|
| 2022/0116988 A1* | 4/2022 | Shi | H04L 1/1887 |
| 2022/0124780 A1* | 4/2022 | Lei | H04L 5/0053 |
| 2022/0209915 A1* | 6/2022 | Tsai | H04L 5/0094 |
| 2022/0210798 A1* | 6/2022 | Tsai | H04W 72/1263 |
| 2022/0271890 A1* | 8/2022 | Grossmann | H04B 7/0695 |
| 2023/0262688 A1* | 8/2023 | Kiilerich Pratas | H04W 72/542 |
| | | | 370/329 |

OTHER PUBLICATIONS

Vivo, "Discussion on channel structure for 2-step RACH" 3GPP TSG RAN WG1 #97, R1-1906124, Reno, USA, May 13-17, 2019, 14 pages.

Mediatek Inc., "CG-based SDT" 3GPP TSG-RAN WG2 #112-e, R2-2009057, E-meeting, Nov. 2-13, 2020, 5 pages.

Samsung, "Channel Structure for Two-Step RACH" 3GPP TSG RAN WG1 #98bis, R1-1910453, Chongqing, China, Oct. 14-20, 2019, 14 pages.

Intel Corporation, "Remaining Details of Channel Structure for 2-step RACH", 3GPP TSG RAN WG1 #101, R1-2003724, e-Meeting, May 25-Jun. 5, 2020, 6 pages.

Ericsson, "Discussion on RAN1 aspects for NR small data transmissions in INACTIVE state" 3GPP TSG-RAN WG1 Meeting #105-e, R1-2105508, e-Meeting, May 10-May 27, 2021, 4 pages.

TSG RAN WG2 "LS on physical layer aspects of small data transmission", 3GPP TSG-RAN WG2 Meeting #112e, R2-2010841 eMeeting, Nov. 2-13, 2020, 2 pages.

ZTE Corporation, "Work Item on NR smalldata transmissions in INACTIVE state" 3GPP TSG RAN Meeting #88e RP-201305, eMeeting, Jun. 29-Jul. 3, 2020, 5 pages.

* cited by examiner

Dedicated RRC signaling

☒ = 1 CG PUSCH occasion

One CG period       One CG period       The pattern then repeats ...

Time

Single                                    Double

Type 1                                    Type 2

First symbol ($l' = 0$)

Subcarrier

| | 0 | 1 | 2 | 3 | 4 | 5 | 6 | 7 | 8 | 9 | 10 | 11 |
|---|---|---|---|---|---|---|---|---|---|---|---|---|
| Port 0: | r(0) | 0 | r(1) | 0 | r(2) | 0 | r(3) | 0 | r(4) | 0 | r(5) | 0 |
| Port 1: | r(0) | 0 | -r(1) | 0 | r(2) | 0 | -r(3) | 0 | r(4) | 0 | -r(5) | 0 |
| Port 2: | 0 | r(0) | 0 | r(1) | 0 | r(2) | 0 | r(3) | 0 | r(4) | 0 | r(5) |
| Port 3: | 0 | r(0) | 0 | -r(1) | 0 | r(2) | 0 | -r(3) | 0 | r(4) | 0 | -r(5) |

| | 0 | 1 | 2 | 3 | 4 | 5 | 6 | 7 | 8 | 9 | 10 | 11 |
|---|---|---|---|---|---|---|---|---|---|---|---|---|
| Port 4: | r(0) | 0 | r(1) | 0 | r(2) | 0 | r(3) | 0 | r(4) | 0 | r(5) | 0 |
| Port 5: | r(0) | 0 | -r(1) | 0 | r(2) | 0 | -r(3) | 0 | r(4) | 0 | -r(5) | 0 |
| Port 6: | 0 | r(0) | 0 | r(1) | 0 | r(2) | 0 | r(3) | 0 | r(4) | 0 | r(5) |
| Port 7: | 0 | r(0) | 0 | -r(1) | 0 | r(2) | 0 | -r(3) | 0 | r(4) | 0 | -r(5) |

Second symbol ($l' = 1$)

Subcarrier

| | 0 | 1 | 2 | 3 | 4 | 5 | 6 | 7 | 8 | 9 | 10 | 11 |
|---|---|---|---|---|---|---|---|---|---|---|---|---|
| Port 0: | r(0) | 0 | r(1) | 0 | r(2) | 0 | r(3) | 0 | r(4) | 0 | r(5) | 0 |
| Port 1: | r(0) | 0 | -r(1) | 0 | r(2) | 0 | -r(3) | 0 | r(4) | 0 | -r(5) | 0 |
| Port 2: | 0 | r(0) | 0 | r(1) | 0 | r(2) | 0 | r(3) | 0 | r(4) | 0 | r(5) |
| Port 3: | 0 | r(0) | 0 | -r(1) | 0 | r(2) | 0 | -r(3) | 0 | r(4) | 0 | -r(5) |

| | 0 | 1 | 2 | 3 | 4 | 5 | 6 | 7 | 8 | 9 | 10 | 11 |
|---|---|---|---|---|---|---|---|---|---|---|---|---|
| Port 4: | -r(0) | 0 | -r(1) | 0 | -r(2) | 0 | -r(3) | 0 | -r(4) | 0 | -r(5) | 0 |
| Port 5: | -r(0) | 0 | r(1) | 0 | -r(2) | 0 | r(3) | 0 | -r(4) | 0 | r(5) | 0 |
| Port 6: | 0 | -r(0) | 0 | -r(1) | 0 | -r(2) | 0 | -r(3) | 0 | -r(4) | 0 | -r(5) |
| Port 7: | 0 | -r(0) | 0 | r(1) | 0 | -r(2) | 0 | r(3) | 0 | -r(4) | 0 | r(5) |

Figure 8:
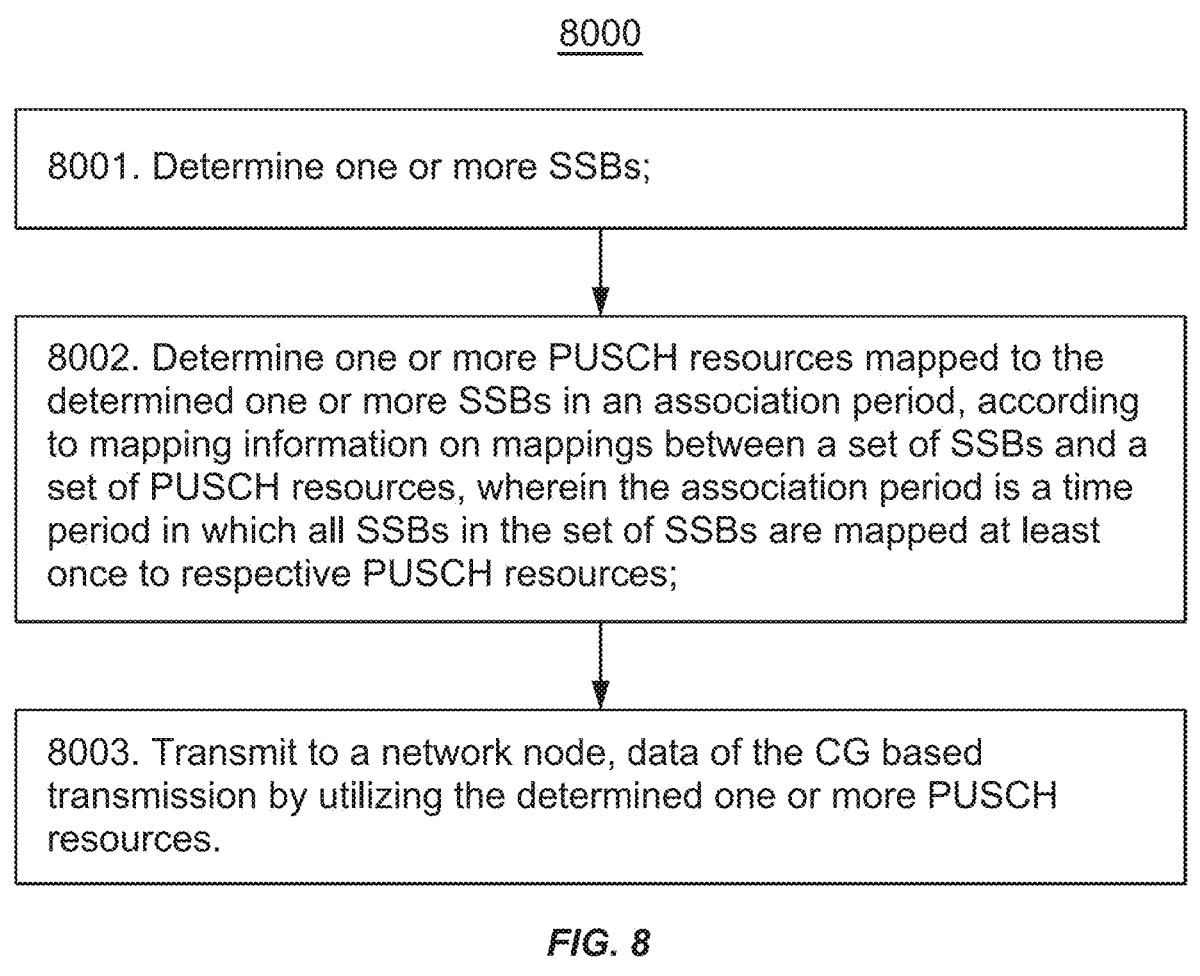

8001. Determine one or more SSBs;

8002. Determine one or more PUSCH resources mapped to the determined one or more SSBs in an association period, according to mapping information on mappings between a set of SSBs and a set of PUSCH resources, wherein the association period is a time period in which all SSBs in the set of SSBs are mapped at least once to respective PUSCH resources;

8003. Transmit to a network node, data of the CG based transmission by utilizing the determined one or more PUSCH resources.

9001. Receive from a user equipment, data of the CG based transmission in an association period, the association period is a time period in which all SSBs in the set of SSBs are mapped at least once to respective PUSCH resources;

9002. Determine one or more PUSCH resources utilized by the CG based transmission;

9003. Determine one or more SSBs mapped to the determined one or more PUSCH resources, according to mapping information on mappings between a set of SSBs and a set of PUSCH resources.

Figure 9

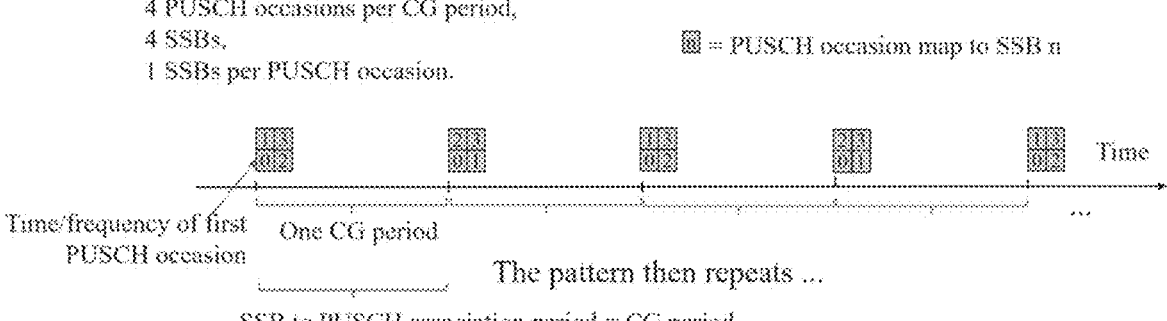

4 PUSCH occasions per CG period,
4 SSBs,
1 SSBs per PUSCH occasion.

▦ = PUSCH occasion map to SSB n

Time

Time/frequency of first PUSCH occasion

One CG period

The pattern then repeats ...

SSB to PUSCH association period = CG period

Figure 10

METHOD AND APPARATUS FOR CONFIGURED GRANT BASED TRANSMISSION

CROSS REFERENCE TO RELATED APPLICATION(S)

This application is a 35 U.S.C. § 371 National Phase Entry Application from PCT/CN2021/143793, filed Dec. 31, 2021, designating the United States, and also claims the benefit of International Application No. PCT/CN2021/070174, filed Jan. 4, 2021, the disclosures of which are incorporated herein by reference in their entirety.

TECHNICAL FIELD

The non-limiting and exemplary embodiments of the present disclosure generally relate to the technical field of wireless communications, and specifically to methods, apparatuses and computer programs for configured grant (CG) based transmission.

BACKGROUND

This section introduces aspects that may facilitate a better understanding of the disclosure. Accordingly, the statements of this section are to be read in this light and are not to be understood as admissions about what is in the prior art or what is not in the prior art.

The $5^{th}$ generation (5G) communication needs to support services that typically requires only infrequent small data traffic. Examples of these services include traffic from instant messaging (IM) services, such as WhatsApp and WeChat, heart-beat traffic from IM/email clients and other apps, push notifications from various applications, industrial wireless sensors transmitting temperature, or pressure data periodically, etc.

The new radio (NR) supports RRC_INACTIVE state. User Equipments (UEs) with infrequent (periodic and/or non-periodic) data transmission are generally maintained by the network in the RRC_INACTIVE state. Until NR Rel-16, the RRC_INACTIVE state doesn't support data transmission. Hence, the UE has to resume the connection (i.e. move to RRC_CONNECTED state) for any downlink and uplink data. Connection setup and subsequently release to INAC-TIVE state happens for each data transmission regardless of how small and infrequent the data packets are. This results in unnecessary power consumption and signalling overhead. The signaling overhead for setting up connections before each transmission can be larger than the size of the actual data payload. To reduce the signaling overhead and improve UE battery life, a research on small data transmission (SDT) in RRC_INACTIVE state is ongoing.

Two main solutions are proposed for enabling SDT in RRC_INACTIVE state: RACH-based SDT, which transmits data of SDT on Message A PUSCH (Physical Uplink Shared Channel) in a 2-step RACH (Random Access Channel) procedure, or transmits data of SDT on Message 3 PUSCH in a 4-step RACH procedure; and configured grant (CG) based SDT, which transmits data of SDT over configured grant type-1 PUSCH resources. The 2-step RACH procedure, 4-step RACH procedure and configured grant type-1 PUSCH transmission have already been specified as part of Rel-15 and Rel-16. So, these two solutions enable small data transmission in INACTIVE state for NR.

The transmission efficiency for SDT can be improved by beam alignment between a UE and a gNB. For RACH-based SDT, a UE can detect one good SSB (synchronization signal and physical broadcast channel blocks) beam. A random-access preamble in the set of one or more preambles mapped to this good SSB beam can be selected for the random access. Thus, when a gNB detects the selected preamble, the good SSB beam for this UE is known indirectly at the gNB, so that a beam alignment between a UE and a gNB can be achieved. For example, best beams can be used for trans-mitting signals to or receiving signals from this UE.

For CG-based SDT, the RACH procedure is skipped. After selecting an SSB, a UE will transmit its small data on CG PUSCH resource(s), that is pre-configured for its SDT. A gNB cannot know which SSB beam is good for this UE. Consequently, it is hard to improve transmission efficiency for transmission between the gNB and this UE by using best beams. Therefore, an association between CG PUSCH resource(s) and SSB(s) is required for CG-based SDT, to achieve the beam alignment between the UE and the gNB.

However, it is not clear how to make association between CG resources and SSBs for CG-based SDT.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Various embodiments of the present disclosure mainly aim at providing methods, apparatuses and computer pro-grams for improving transmission efficiency for CG based transmission by establishing mappings between SSBs and PUSCH resources configured for the CG based transmis-sion. To support the mapping, periodicity of the mappings between SSBs and the PUSCH resources is defined, which is referred to as an association period in this disclosure. Furthermore, the mappings between SSBs and PUSCH occasions may form a mapping pattern, so that the mapping pattern of SSBs to the PUSCH occasions can be repeated identically over time. Periodicity of the mapping pattern can be defined, which is referred to as an association pattern period.

Other features and advantages of embodiments of the present disclosure will also be understood from the follow-ing description of specific embodiments when read in con-junction with the accompanying drawings, which illustrate, by way of example, the principles of embodiments of the present disclosure.

In a first aspect of the present disclosure, there is provided a method for CG based transmission at a user equipment in a communication system. The method comprises: determin-ing one or more synchronization signal and physical broad-cast channel blocks (SSBs); determining one or more physi-cal uplink shared channel (PUSCH) resources mapped to the determined one or more SSBs in an association period, according to mapping information on mappings between a set of SSBs and a set of PUSCH resources; and transmitting to a network node, data of the CG based transmission by utilizing the determined one or more PUSCH resources. The association period is a time period in which all SSBs in the set of SSBs are mapped at least once to respective PUSCH resources.

In some embodiments, the method may further comprise: receiving from a network node, a message indicating the association period.

In some embodiments, the association period may be defined according to at least one of the following parameters: a CG period indicating periodicity of PUSCH resources configured by a CG configuration, a number of PUSCH resources per CG period, a number of SSBs in the set of SSBs, an SSB transmission period indicating periodicity for transmitting the set of SSBs, an SSB monitoring period indicating periodicity for monitoring the set of SSBs, a frequency band and/or subcarrier spacing of PUSCH transmission, and a length of a cyclic prefix of the PUSCH transmission.

In some embodiments, the association period may be a value in a set of candidate values. The set of candidate values is determined by at least a CG period according to a mapping between the CG period and the association period. In some embodiments, the association period is a smallest value, during which at least all SSBs in the set of SSBs are mapped at least once to respective PUSCH resources, in the set of candidate values of time periods.

In some embodiments, a maximum value in the set of candidate values may be a value of a maximum candidate CG period.

In some embodiments, a minimum value in the set of candidate values may be not smaller than a minimum candidate value of the SSB transmission period supported by the communication system.

In some embodiments, when the CG period is smaller than the minimum candidate value of the SSB transmission period, the association period is a candidate CG period that is divisible by all candidate CG periods smaller than the minimum candidate value of the SSB transmission period. When the CG period is smaller than 5 ms, the association period may be 20 ms.

In some embodiments, a minimum value in the set of candidate values may be smaller than the minimum candidate value of the SSB transmission period, and may be not smaller than 1 ms.

In some embodiments, when the CG period is smaller than 1 ms, the association period may be a candidate CG period that is divisible by all candidate CG periods smaller than 1 ms. When the CG period is smaller than 1 ms, the association period may be 5 ms.

In some embodiments, the association period may be an integer multiple n of a CG period Tcg, i.e. $n \times T_{cg}$.

In some embodiments, the integer multiple n may be determined by a function of an integer k, $f(k)$, and k is a smallest integer so that all SSBs in the set of SSBs are mapped at least once to respective PUSCH resources within a period of k CG periods.

In some embodiments, the function $f(k)$ may be determined as one of the following: $f(k)=k$; and $f(k)=2^{\lceil log_2k \rceil}$, where $\lceil x \rceil$ represents a ceiling function of x.

In some embodiments, the function $f(k)$ is determined so that the integer multiple n of a CG period $T_{cg}$ is not smaller than a first threshold $T_{min}$.

In some embodiments, the function $f(k)$ may be determined as one of the following:

- if $k \times T_{cg} \geq T_{min}$, $f(k) = k$, otherwise, $f(k) = \left\lceil \dfrac{T_{min}}{T_{cg}} \right\rceil \times T_{cg}$; and

- if $2^{\lceil log_2k \rceil} \times T_{cg} \geq T_{min}$, $f(k) = 2^{\lceil log_2k \rceil}$, otherwise, $f(k) = 2^{\left\lceil log_2\left\lceil \frac{T_{min}}{T_{cg}} \right\rceil \right\rceil}$.

In some embodiments, the association period may be not larger than a second threshold $T_{max}$.

In some embodiments, the set of PUSCH resources may comprise multiple PUSCH occasions, and mappings between the set of SSBs and the set of PUSCH resources in the association period may be done by associating the multiple PUSCH occasions in the association period to each SSB in the set of SSBs in an order of consecutive PUSCH resource indexes.

In some embodiments, the order of consecutive PUSCH resource indexes may be determined according to at least one of the following orders: an order of frequency resource indexes of the respective PUSCH occasions, an order time resource indexes of the respective PUSCH occasions within a CG period, and an order of CG period indexes within the association period.

In some embodiments, if there is a leftover PUSCH occasion after one or multiple mapping cycles within the association period, no SSBs may be mapped to the leftover PUSCH occasion. The mapping cycle is a time duration within which all SSBs in the set of SSBs are mapped once to respective PUSCH resources.

In some embodiments, multiple CG configurations may be configured for the user equipment, an independent association period is defined for each of the multiple CG configurations independently from other CG configurations.

In some embodiments, when the set of PUSCH resources comprises an overlapping PUSCH occasion which is configured by different CG configurations, the method may further comprise: transmitting to the network node together with the data of the CG based transmission, additional information about an SSB mapped to the overlapping PUSCH occasion.

In some embodiments, when the set of PUSCH resources comprises an overlapping PUSCH occasion which is configured by different CG configurations, an SSB mapped to the overlapping PUSCH occasion may be determined based on at least one of the following: it is not necessary to differentiate the multiple CG configurations in case that SSB indexes mapped to the overlapping PUSCH occasion in the different CG configurations are the same; and a predetermined index of a CG configuration, where the overlapping PUSCH occasion is mapped to an SSB according to a CG configuration with predetermined index.

In some embodiments, PUSCH resources configured by different CG configurations may be non-overlapping.

In some embodiments, multiple CG configurations may be configured for the user equipment, the association period is defined as a common association period, during which all SSBs in the set of SSBs are mapped at least once to respective PUSCH resources for each of the multiple CG configurations.

In some embodiments, the common association period may be defined as: a minimum common multiple of independent association periods of all the multiple CG configurations, where an independent association period is an association period defined for an CG configuration independently from other CG configurations, or a maximum value among independent association periods of all the multiple CG configurations.

In some embodiments, only one CG configuration may be configured for the user equipment.

In some embodiments, the method may further comprise: determining one or more PUSCH resources mapped to the determined one or more SSBs in an association pattern period. The association pattern period includes one or more association periods and is a time period in which a same pattern of mappings between indexes of SSBs in the set SSBs and the set of PUSCH resources repeats across different association pattern periods.

In some embodiments, the association pattern period may be a maximum candidate CG period.

In some embodiments, the method may further comprise: invalidating a PUSCH resource that is not mapped to any SSBs after an integer number of association periods in an association pattern period.

In some embodiments, the method may further comprise: determining to release PUSCH resources configured for the CG based transmission, in case that there is no CG based transmission for a number of consecutive association periods or a number of consecutive association pattern periods.

In some embodiments, the method may further comprise: switching to random access channel (RACH) based transmission after a number of consecutive association periods or a number of consecutive association pattern periods. The switching to RACH based transmission may be caused by at least one of the following: the user equipment failing to transmit data of the CG based transmission for the number of consecutive association periods or for the number of consecutive association pattern periods; and determining to release PUSCH resources configured for the CG based transmission in case that there is no CG based transmission for the number of consecutive association periods or the number of consecutive association pattern periods.

In some embodiments, the set of SSBs may be SSBs actually transmitted from the network node. The set of SSBs may be the number of SSBs derived from the value of ssb-PositionsInBurst in a message SIB1 or in information element ServingCellConfigCommon.

In some embodiments, the CG based transmission may be a CG-based small data transmission.

In a second aspect of the present disclosure, there is provided a method for CG based transmission at a network node. The method comprises: receiving from a user equipment, data of the CG based transmission in an association period; determining one or more PUSCH resources utilized by the CG based transmission; and determining one or more synchronization signal and physical broadcast channel blocks (SSBs) mapped to the determined one or more PUSCH resources, according to mapping information on mappings between a set of SSBs and a set of PUSCH resources. The association period is a time period in which all SSBs in the set of SSBs are mapped at least once to respective PUSCH resources.

In some embodiments, the method may further comprise: transmitting to the user equipment, a message indicating the association period.

In some embodiments, the method may further comprise: transmitting to the user equipment, information by utilizing the determined one or more SSBs.

In some embodiments, the method may further comprise: receiving from the user equipment, data of the CG based transmission in an association pattern period. The association pattern period includes one or more association periods and is a time period in which a same pattern of mappings between indexes of SSBs in the set SSBs and the set of PUSCH resources repeats across different association pattern periods.

In some embodiments, the method may further comprise: invalidating a PUSCH resource that is not mapped to any SSBs after an integer number of association periods in an association pattern period.

In some embodiments, the method may further comprise: determining to release PUSCH resources configured for the CG based transmission for the user equipment, in case that there is no CG based transmission for the user equipment for a number of consecutive association periods or a number of consecutive association pattern periods.

In some embodiments, the method may further comprise: switching the user equipment to random access channel (RACH) based transmission after a number of consecutive association periods or a number of consecutive association pattern periods. The switching the user equipment to RACH based transmission may be caused by at least one of the following: failing to receive data of the CG based transmission from the user equipment for the number of consecutive association periods or for the number of consecutive association pattern periods; and determining to release PUSCH resources configured for the CG based transmission for the user equipment, in case that there is no CG based transmission for the user equipment for the number of consecutive association periods or the number of consecutive association pattern periods.

The association period and the association pattern period may be defined in a same way as described with respect to the first aspect.

In a third aspect of the present disclosure, there is provided an apparatus. The apparatus may comprise a processor and a memory coupled to the processor. The memory may contain instructions executable by the processor, whereby the apparatus is operative to perform any step of the method according to the first aspect of the disclosure In a fourth aspect of the present disclosure, there is provided an apparatus. The apparatus may comprise a processor and a memory coupled to the processor. The memory may contain instructions executable by the processor, whereby the apparatus is operative to perform any step of the method according to the second aspect of the disclosure.

In a fifth aspect of the present disclosure, there is provided a computer-readable medium having computer program codes embodied thereon which, when executed on a computer, cause the computer to perform any step of the method according to the first aspect of the present disclosure.

In a sixth aspect of the present disclosure, there is provided a computer-readable medium having computer program codes embodied thereon which, when executed on a computer, cause the computer to perform any step of the method according to the second aspect of the present disclosure.

According to the various aspects and embodiments as mentioned above, it can enhance efficiency for CG based transmission.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 7 illustrates an example of Double-symbol Type 1 DMRS ports multiplexing with both FD-OCC and TD-OCC;

FIG. 8 illustrate a flowchart of a method for CG based transmission at a user equipment according to some embodiments of the present disclosure;

FIG. 9 illustrates a flowchart of a method for CG based transmission at a network node according to some embodiments of the present disclosure;

FIG. 10 illustrates an example of mapping different SSBs to different PUSCH occasions within each CG period, according to some embodiments of the present disclosure;

DETAILED DESCRIPTION

Figure 1:
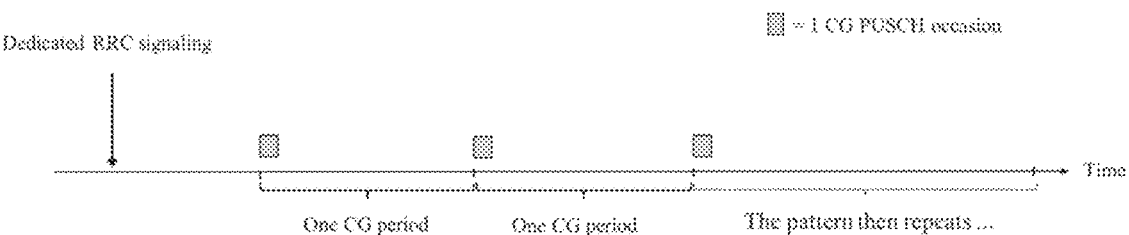
FIG. 1 illustrates an example of PUSCH resources preconfigured by using Configured Grant Type 1 scheme.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "user equipment" refers to any end device that can access a communication network and receive services therefrom. By way of example and not limitation, the user equipment may refer to a UE, a terminal device or other suitable devices. The UE may be, for example, a subscriber station, a portable subscriber station, a mobile station (MS) or an access terminal (AT). The user equipment may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a user equipment may also be called an IoT device and represent a machine or other device that performs monitoring, sensing and/or measurements etc., and transmits the results of such monitoring, sensing and/or measurements etc. to another terminal device and/or a network equipment. The user equipment may in this case be a machine-to-machine (M2M) device, which may in a 3rd generation partnership project (3GPP) context be referred to as a machine-type communication (MTC) device.

As one particular example, the user equipment may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a user equipment may represent a vehicle or other equipment, for example, a medical instrument that is capable of monitoring, sensing and/or reporting etc. on its operational status or other functions associated with its operation.

As used herein, the term "a set of" components means that there are one or more components in one set. For example, a set of SSBs refers to one set in which there may be only one SSB, or in which there may be a plurality of SSBs. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In the following description and claims, unless defined otherwise, all technical and scientific terms used herein have the same meaning as commonly understood by one of ordinary skills in the art to which this disclosure belongs. For example, the term "user equipment" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "terminal device", "user equipment" and "UE" may be used interchangeably. Similarly, the term "network node" may represent any network functionality in a 5G network.

This disclosure focuses on schemes for the CG based transmission, such as CG based small data transmission (SDT). A configuration of CG resource to be used for small data transmission of a UE in uplink can be contained in the RRC Release message. The configuration may be only type 1 CG with no contention resolution procedure for CG. A configuration of CG resources may include one type 1 CG configuration. The configuration of CG resources for small data transmission of a UE is valid only in a same serving cell. A UE can use CG based SDT if at least the following criteria are fulfilled: (1) user data is smaller than a data volume threshold; (2) CG resource is configured and valid; (3) the UE has valid timing advance (TA).

As mentioned above, an association between CG resources and SSBs is required for multi-beam operation for CG-based SDT. One scheme is considered to send an explicit configuration of the association to a UE with a RRC Release message. A SS-RSRP (synchronization signals-reference signal received power) threshold can be configured for a SSB selection. A UE can select one of SSBs with SS-RSRP above the threshold. Then, a CG resource associated with the selected SSB can be selected for uplink data transmission. However, this scheme would consume many transmission resources.

The present disclosure provides different schemes for determining the association between one or more SSBs and one or more resources for CG based transmission. The association is determined based on mappings between SSBs and resources configured for the CG based transmission. The mappings have periodicity, which is referred to as an association period.

The CG based transmission can be performed in PUSCH (physical uplink shared channel), such as CG type 1 PUSCH transmission. The CG resources on PUSCH (also referred to as CG configured PUSCH, or PUSCH resources configured for CG based transmission, in this disclosure) are the PUSCH resources that configured in advance for the UE. In an example. when there is uplink data available at a UE's buffer, it can immediately start uplink transmission using the pre-configured PUSCH resources, without waiting for an uplink grant from a gNB, thus reducing the latency. NR supports CG type 1 PUSCH transmission and CG type 2 PUSCH transmission. For both two types, the PUSCH resources (e.g. time and frequency allocation, periodicity, etc.) are pre-configured via dedicated RRC signaling. The CG type 1 PUSCH transmission is activated/deactivated by RRC signaling, while the CG type 2 PUSCH transmission is activated/deactivated by an uplink grant using downlink control information (DCI) signaling.

FIG. 1 illustrates an example of PUSCH resources pre-configured by using CG type 1 scheme. As shown in FIG. 1, PUSCH occasions (i.e. time resources and/or frequency resources) allocated for the CG based transmission is periodic. For CG based transmission, the PUSCH resources are pre-configured (e.g. time and frequency allocation, settings of periodicity for UL transmission, etc.) via dedicated RRC signaling. In this regard, periodicity for CG based transmission is indicated via a CG period. For example, in NR 16, the CG period can be of following values depending on the CP configuration and the numerology:
Periodicity Periodicity for UL transmission without UL grant for type 1 and type 2 (see 3GPP TS 38.321 v16.2.1, clause 5.8.2).

The following periodicities (in symbols) are supported depending on the configured subcarrier spacing and CP (cyclic prefix) length:

TABLE 1

| CG periods supported depending on subcarrier spacing and CP | |
|---|---|
| Subcarrier spacing | CG period (in symbols) |
| 15 kHz | 2, 7, n*14, where n = {1, 2, 4, 5, 8, 10, 16, 20, 32, 40, 64, 80, 128, 160, 320, 640} |
| 30 kHz | 2, 7, n*14, where n = {1, 2, 4, 5, 8, 10, 16, 20, 32, 40, 64, 80, 128, 160, 256, 320, 640, 1280} |
| 60 kHz with normal CP (cyclic prefix) | 2, 7, n*14, where n = {1, 2, 4, 5, 8, 10, 16, 20, 32, 40, 64, 80, 128, 160, 256, 320, 512, 640, 1280, 2560} |
| 60 kHz with extended CP | 2, 6, n*12, where n = {1, 2, 4, 5, 8, 10, 16, 20, 32, 40, 64, 80, 128, 160, 256, 320, 512, 640, 1280, 2560} |
| 120 kHz | 2, 7, n*14, where n = {1, 2, 4, 5, 8, 10, 16, 20, 32, 40, 64, 80, 128, 160, 256, 320, 512, 640, 1024, 1280, 2560, 5120} |

It should be appreciated that, the CG period is not limited to the above values. There may be other CG period values supported in other communication system, or in the future system.

Figure 2:
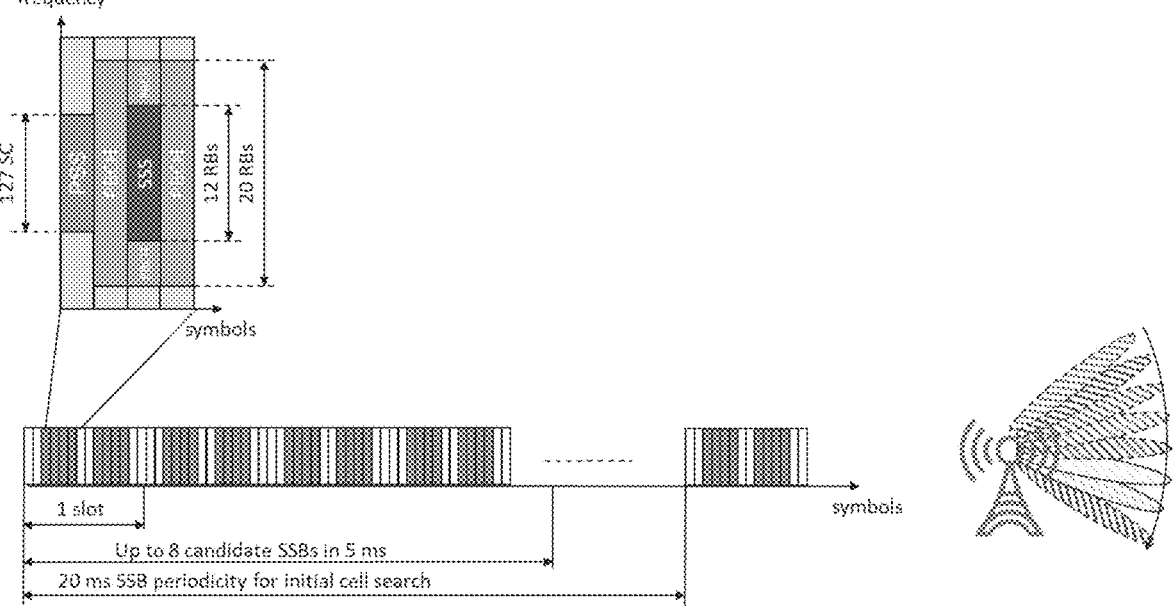
FIG. 2 illustrates an example of SSB multi-beam sweeping.

Beamforming is important for improving the coverage of synchronization signals (SSs) and physical broadcast channel (PBCH) block (referred to as SSB in 3GPP) transmission, especially for compensating the high path loss in high carrier frequency bands. To support beamforming and beam-sweeping for SSB transmission, in NR, a cell can transmit multiple SSBs in different narrow-beams in a time multiplexed fashion. The transmission of these SS/PBCH blocks is confined to a half frame time interval (5 ms). FIG. 2 illustrates an example of SSB beam sweeping when the system is operating at frequency range 1 (FR 1).

The maximum number of SSBs within a half frame (i.e., 5 ms), denoted by L, depends on the frequency band, and it is defined as follows:
For carrier frequencies smaller than or equal to 3 GHz, L=4;
For carrier frequencies within FR1 larger than 3 GHz, L=8;
For carrier frequencies within FR2, L=64.

Figure 3:
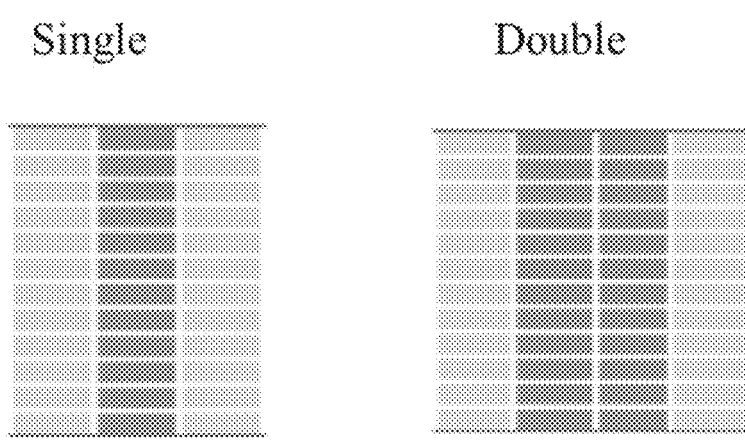
FIG. 3 illustrates single-symbol or double-symbol based DMRS.

PUSCH is always transmitted with demodulation reference signal (DMRS), which is used by a gNB for channel estimation and PUSCH decoding. In NR, DMRS design can be categorized as below in different aspects. As is shown in FIG. 3, DMRS can be either single-symbol or double-symbol based, where double symbol based is only used for dedicated PDSCH and PUSCH transmissions.

Figure 4:
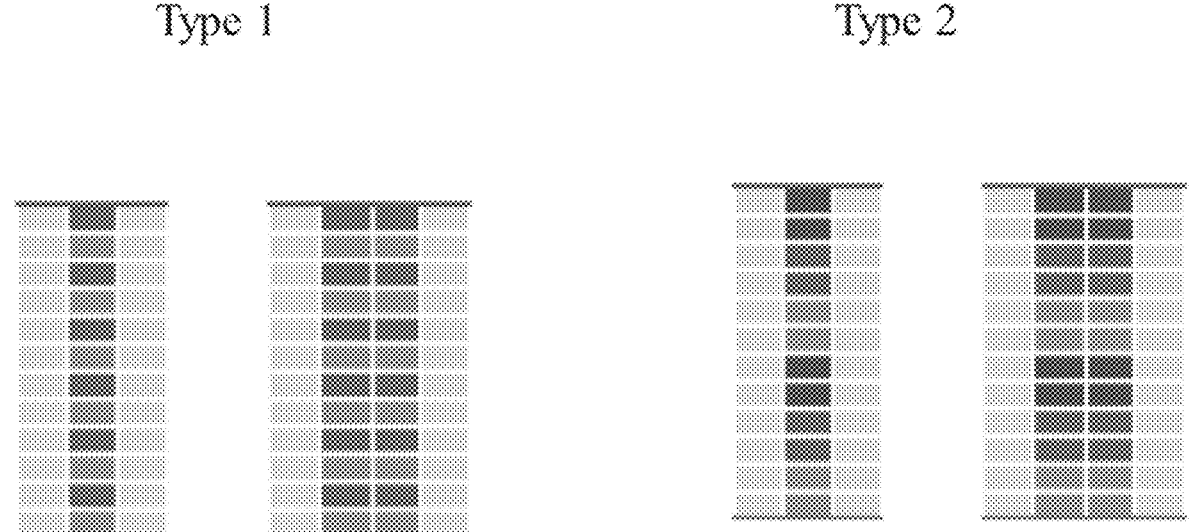
FIG. 4 illustrates frequency mapping of DMRS

Frequency mapping of DMRS can be seen in FIG. 4, where 2 types of mapping is defined. Before RRC connection, DMRS Type 1 is used. DMRS Type 1 is comb based with 2 CDM (Code Division Multiplexing) groups. DMRS Type 2 is non-comb based with 3 CDM* groups.

Figure 5:
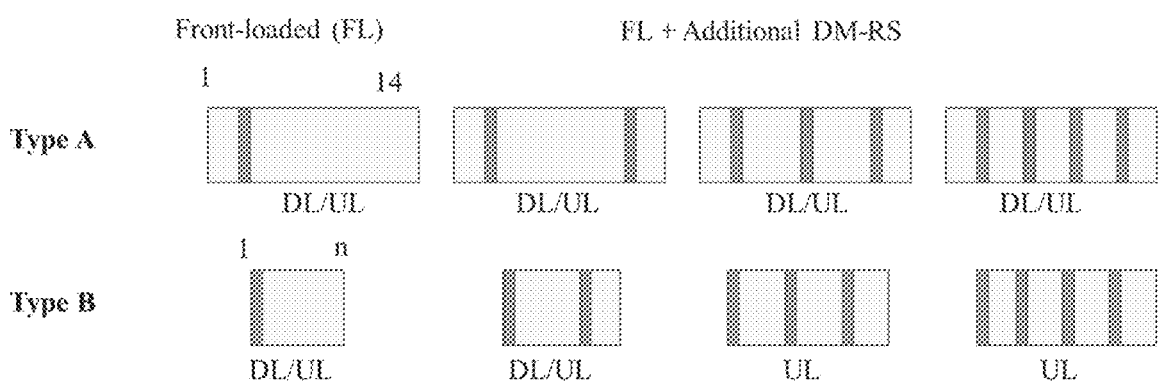
FIG. 5 illustrates OFDM symbol mapping of DMRS within a slot.

The OFDM Symbol mapping of DMRS to symbols within a slot can be seen in FIG. 5, where the mapping depends on the scheduling type. The scheduling type is dynamically indicated in the DCI that schedules the PDSCH or PUSCH transmission.

Type A is slot-based scheduling, where DMRS starts in symbol 3 or 4 from slot boundary (depending on configuration indication in PBCH).

Type B is non-slot-based scheduling, where DMRS starts in PDSCH (physical downlink share channel) or PUSCH symbol 1 (unless it collides with a PDCCH (Physical Downlink Control Channel), in which case DMRS is moved to the first available symbol later in time).

Figure 6:
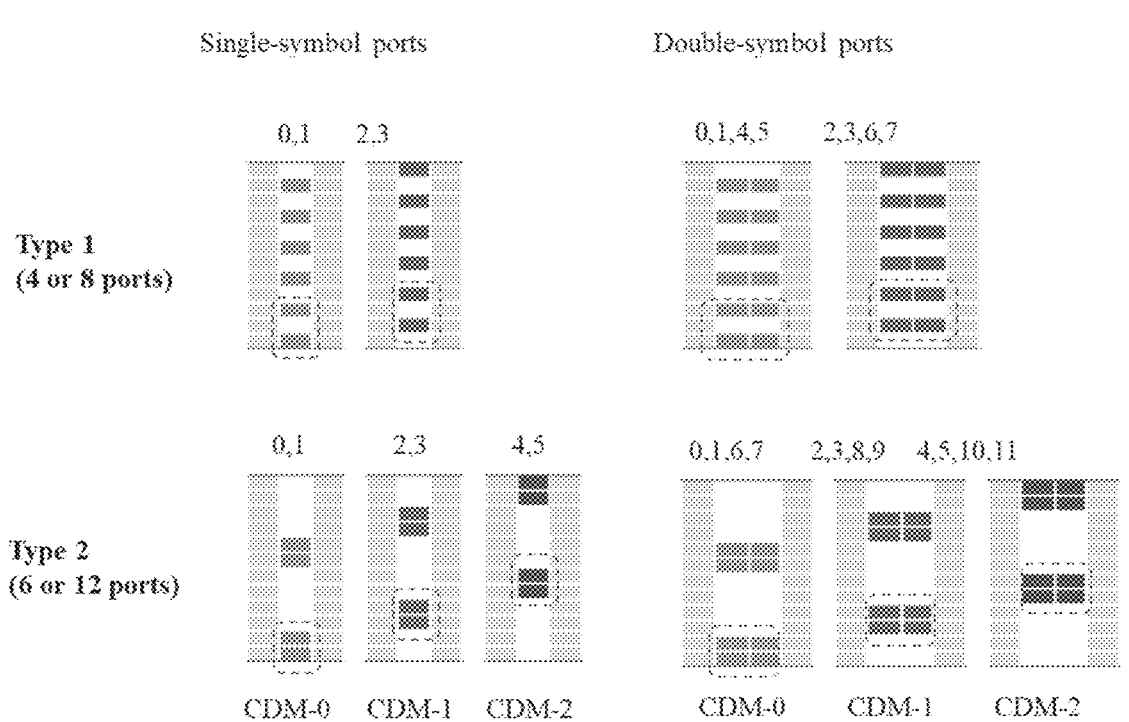
FIG. 6 illustrates DMRS ports multiplexing.

As seen in FIG. 5, additional DMRS symbols (e.g. 1, 2 or 3 additional DMRS symbols) could be configured. By default, two additional symbols are configured (e.g. to be used before RRC configuration). The two additional symbols can be changed for dedicated PDSCH and PUSCH transmissions. The default of two additional symbols is always used when scheduled by the fallback DCI formats 0_0 and 1_0. In addition, FIG. 6 shows the nominal DMRS patterns, assuming the nominal full length slot (i.e. 14 symbols for Type A) and if the duration of PDSCH or PUSCH is shorter, then DMRS symbols are dropped. For example, even if two additional symbols (i.e. in total three symbols) are configured, the actual number of DMRS symbols used for a transmission can be fewer if the PDSCH or PUSCH duration is less than the nominal length.

DMRS port multiplexing can be illustrated in FIG. 6, wherein maximum 4 or 8 ports can be multiplexed with type 1 DMRS and maximum 6 or 12 ports can be multiplexed with type 2 DMRS for single and double symbol DMRS, respectively. Both frequency division multiplexing (FDM), and frequency domain orthogonal cover code (FD-OCC) as well as time domain orthogonal cover code (TD-OCC) can be used to separate the orthogonal antenna ports.

OCC shall be FD-OCC only for single symbol DMRS, and shall be both FD-OCC and TD-OCC for multiplexing of the DMRS ports for 2 symbol DMRS.

FIG. 7 provides an example of double-symbol Type 1 DMRS ports multiplexing with both FD-OCC and TD-OCC, where r(i) is one sample of the DMRS sequence, and one PRB is illustrated on 2 OFDM symbols with DMRS. As can be seen, 2 OCC code in frequency domain, 2 OCC code in time domain, and 2 CDM groups provide 8 DMRS ports.

DMRS can be transmitted in an orthogonal fashion by transmitting the DMRS in REs (resource elements) not occupied by other DMRSs (i.e. by FDM) or using a different orthogonal cover code (OCC) from DMRSs that occupy the same REs. Since the number of orthogonal DMRSs is limited by the number of REs that the DMRS occupies, it is desirable to support non-orthogonal DMRSs as well to increase the multiplexing capacity. DMRS generation in NR supports both orthogonal and non-orthogonal DMRS generation, as can be understood by, e.g., 3GPP TS 38.211 V16.3.0, sections 6.4.1.1.1.1 and 6.4.1.1.1.2, which are incorporated in this disclosure below. Here is it shown that the sequence r(i) can be configured differently to different UEs, hence even if they use the same FDM, TD-OCC and FD-OCC, they can be separated by a use of different sequences r(i).

6.4.1.1.1.1 Sequence Generation when Transform Precoding is Disabled

If transform precoding for PUSCH is not enabled, the sequence r(n) shall be generated according to $$r(n) = \frac{1}{\sqrt{2}}(1 - 2 \cdot c(2n))j\frac{1}{\sqrt{2}}(1 - 2 \cdot c(2n+1)).$$

where the pseudo-random sequence c(i) is defined in clause 5.2.1. The pseudo-random sequence generator shall be initialized with $$c_{init} = \left(2^{17}\left(N_{symb}^{slot}n_{s,f}^{\mu} + l + 1\right)\left(2N_{ID}^{\bar{n}_{SCID}} + 1\right) + 2^{17}\left\lfloor\frac{\lambda}{2}\right\rfloor + 2N_{ID}^{\bar{n}_{SCID}} + \bar{n}_{SCID}\right)\mod 2^{31}$$

where l is the OFDM symbol number within the slot, $$n_{s,f}^{\mu}$$

is the slot number within a frame, and $$N_{ID}^0, N_{ID}^1 \in \{0, 1, \dots, 65535\}$$

are given by the higher-layer parameters scramblingID0 and scramblingID1, respectively, in the DMRS-UplinkConfig IE if provided and the PUSCH is scheduled by DCI format 0_1 or 0_2, or by a PUSCH transmission with a configured grant;

$$N_{ID}^0 \in \{0, 1, \dots, 65535\}$$

is given by the higher-layer parameter scramblingID0 in the DMRS-UplinkConfig IE if provided and the PUSCH is scheduled by DCI format 0_0 with the CRC scrambled by C-RNTI, MCS-C-RNTI, or CS-RNTI;

$$N_{ID}^0, N_{ID}^1 \in \{0, 1, \dots, 65535\}$$

are, for each msgA PUSCH configuration, given by the higher-layer parameters msgA-ScramblingID0 and msgA-ScramblingID1, respectively, in the msgA-DMRS-Configuration IE if provided and the PUSCH transmission is triggered by a Type-2 random access procedure as described in clause 8.1A of [5, TS 38.213];

$$N_{ID}^{\bar{n}_{SCID}} = N_{ID}^{cell}$$

otherwise;

$$\overline{n}_{SCID}$$

and $\overline{\lambda}$ are given by
  if the higher-layer parameter dmrs-Uplink-r16 in the DMRS-UplinkConfig IE is provided $$\overline{n}_{SCID} = \begin{cases} n_{SCID} & \lambda = 0 \text{ or } \lambda = 2 \\ 1 - n_{SCID} & \lambda = 1 \end{cases}$$

$$\overline{\lambda} = \lambda$$

where $\lambda$ is the CDM group defined in clause 6.4.1.1.3.
otherwise $$\overline{n}_{SCID} = n_{SCID}$$

$$\overline{\lambda} = 0$$

The quantity $n_{SCID} \in \{0,1\}$ is
  indicated by the DMRS initialization field, if present, either in the DCI associated with the PUSCH transmission if DCI format 0_1 or 0_2, in [4, TS 38.212] is used;
  indicated by the higher layer parameter dmrs-SeqInitialization, if present, for a Type 1 PUSCH transmission with a configured grant or for a PUSCH transmission of Type-2 random access process in [5, TS 38.213];
  determined by the mapping between preamble(s) and a PUSCH occasion and the associated DMRS resource for a PUSCH transmission of Type-2 random access process in [5, TS 38.213];
  otherwise $n_{SCID}=0$.
6.4.1.1.1.2 Sequence Generation when Transform Precoding is Enabled
If transform precoding for PUSCH is enabled, the reference-signal sequence r(n) shall be generated according to $$r(n) = r_{u,v}^{(\alpha,\delta)}(n)$$

$$n = 0, 1, \ldots , M_{sc}^{PUSCH}/2^{\delta} - 1$$

where $$r_{u,v}^{(\alpha,\delta)}(n)$$

with $\delta=1$ depends on the configuration:
  if the higher-layer parameter dmrs-UplinkTransformPre-coding-r16 is configured, $\pi/2$-BPSK modulation is used for PUSCH, and the PUSCH transmission is not a msg3 transmission, and the transmission is not scheduled using DCI format 0_0 in a common search space, $$r_{u,v}^{(\alpha,\delta)}(n)$$

is given by clause 5.2.3 with $c_{init}$ given by $$c_{init} = \left(2^{17}\left(N_{symb}^{slot}n_{s,f}^{\mu} + l + 1\right)\left(2N_{ID}^{n_{SCID}} + 1\right) + 2N_{ID}^{n_{SCID}} + n_{SCID}\right)\mathrm{mod}2^{31}$$

where $n_{SCID}=0$ unless given by the DCI according to clause 7.3.1.1.2 in [4, TS38.212] for a transmission scheduled by DCI format 0_1, or given by the DCI according to clause 7.3.1.1.3 in [4, TS38.212] for a transmission scheduled by DCI format 0_2 if the antenna ports field in the DCI format 0_2 is not 0 bit, or given by the higher-layer parameter antennaPort for a PUSCH transmission scheduled by a type-1 config-ured grant; and $$N_{ID}^0, N_{ID}^1 \in \{0, 1, \ldots , 65535\}$$

are given by the higher-layer parameters pi2BPSK-Scram-blingID0 and pi2BPSK-ScramblingID1, respectively, in the DMRS-UplinkConfig IE if provided and the PUSCH is scheduled by DCI format 0_1, or by DCI format 0_2 if the antenna ports field in the DCI format 0_2 is not 0 bit, or by a PUSCH transmission with a configured grant;

$$N_{ID}^0 \in \{0, 1, \ldots , 65535\}$$

is given by the higher-layer parameter pi2BPSK-Scramblin-gID0 in the DMRS-UplinkConfig IE if provided and the PUSCH is scheduled by DCI format 0_0 with the CRC scrambled by C-RNTI, MCS-C-RNTI, or CS-RNTI, or by DCI format 0_2 if the antenna ports field in the DCI format 0_2 is 0 bit;

$$N_{ID}^{n_{SCID}} = N_{ID}^{cell}$$

otherwise;
  otherwise, $$r_{u,v}^{(\alpha,\delta)}(n)$$

is given by clause 5.2.2 with $\alpha=0$.
The sequence group $$u = \left(f_{gh} + n_{ID}^{RS}\right)$$

mod 30, where $$n_{ID}^{RS}$$

is given by $$n_{ID}^{RS} = n_{ID}^{PUSCH} \text{ if } n_{ID}^{PUSCH}$$

is configured by the higher-layer parameter nPUSCH-Identity in the DMRS-UplinkConfig IE, and the higher-layer parameter dmrs-UplinkTransformPrecoding-r16 is not configured or the higher-layer parameter dmrsUplinkTransformPrecoding-r16 is configured and π/2-BPSK modulation is not used for PUSCH, and the PUSCH is neither scheduled by RAR UL grant nor scheduled by DCI format 0_0 with CRC scrambled by TC-RNTI according to clause 8.3 in [5, TS 38.213];

$$n_{ID}^{RS} = N_{ID}^{n_{SCID}}$$

if the higher-layer parameter dmrs-UplinkTransformPrecoding-r16 is configured, π/2-BPSK modulation is used for PUSCH, the PUSCH transmission is not a msg3 transmission, and the transmission is not scheduled using DCI format 0_0 in a common search space;

$$n_{ID}^{RS} = N_{ID}^{cell}$$

otherwise
where $f_{gh}$ and the sequence number v are given by:
if neither group, nor sequence hopping is enabled $$f_{gh}=0$$

$$v=0$$

if group hopping is enabled and sequence hopping is disabled $$f_{gh} = \left( \sum_{m=0}^{7} 2^m c\left(8\left(N_{symb}^{slot} n_{s,f}^{\mu} + l\right) + m\right)\right) \bmod 30$$

$$v = 0$$

where the pseudo-random sequence c(i) is defined by clause 5.2.1 and shall be initialized with $$c_{init} = \left\lfloor n_{ID}^{RS} / 30 \right\rfloor$$

at the beginning of each radio frame
if sequence hopping is enabled and group hopping is disabled $$f_{gh} = 0$$

$$v = \begin{cases} c\left(N_{symb}^{slot} n_{s,f}^{\mu} + l\right) & \text{if } M_{ZC} \geq 6 N_{sc}^{RB} \\ 0 & \text{otherwise} \end{cases}$$

where the pseudo-random sequence c(i) is defined by clause 5.2.1 and shall be initialized with $$c_{init} = n_{ID}^{RS}$$

at the beginning of each radio frame.
The hopping mode is controlled by higher-layer parameters:
for PUSCH transmission scheduled by RAR UL grant or by DCI format 0_0 with CRC scrambled by TC-RNTI, sequence hopping is disabled and group hopping is enabled or disabled by the higher-layer parameter gtoupHoppingEnabledTransformPrecoding;

for all other transmissions, sequence hopping and group hopping are enabled or disabled by the respective higher-layer parameters sequenceHopping and sequenceGroupHopping if these parameters are provided, otherwise, the same hopping mode as for Msg3 shall be used.

The UE is not expected to handle the case of combined sequence hopping and group hopping. The quantity 1 above is the OFDM symbol number except for the case of double-symbol DMRS in which case 1 is the OFDM symbol number of the first symbol of the double-symbol DMRS.

Considering first the DMRS when transform precoding is not used, since the sequence c(i) is pseudo random, it can be said to scramble the DMRS sequence generating sequence r(n). Furthermore, initializing c(i) with a different initialization value $c_{init}$ from that of another DMRS will cause the two DMRSs corresponding to a given antenna port to be non-orthogonal. Since $c_{init}$ depends on $$N_{ID}^0$$

and/or $$N_{ID}^1$$

and both of these parameters can be signaled to each UE independently of other UEs, they can be said to be scrambling IDs for the DMRS used by the UE. When $$N_{ID}^0$$

or $$N_{ID}^1$$

used by a UE is different from the $$N_{ID}^0$$

or $$N_{ID}^1$$

used by another UE, the DMRS sequences of the two UEs for a given DMRS port are not orthogonal for a given antenna port. However, if $$N_{ID}^0$$

and $$N_{ID}^1$$

are the same as the $$N_{ID}^0$$

and $$N_{ID}^1$$

used by another UE, transmissions by the UEs on different DMRS ports will be orthogonal according to the construction of DMRS in 3GPP TS 38.211 V16.3.0.

Next, considering the DMRS when transform precoding is used, since the sequence $$r_{u,v}^{(\alpha,\delta)}(m)$$

is Zadoff-Chu sequence, it can be said to apply different cyclic shifts and root values of the root sequence to generate sequence r(n).

Furthermore, considering a same cyclic shift, applying different groups, i.e. u values for two DMRSs corresponding to a given antenna port will generate 2 non-orthogonal DMRS sequences. Since u depends on $f_{gh}$ and $$n_{ID}^{RS}$$

and both of these parameters can be signaled by dedicated signalling from network to each UE independently of other UEs, they can be interpreted to be scrambling IDs for the DMRS used by the UE. When $f_{gh}$ and $$n_{ID}^{RS}$$

used by a UE is different from the $f_{gh}$, and $$n_{ID}^{RS}$$

used by another UE, the DMRS sequences of the two UEs for a given DMRS port are not orthogonal for a given antenna port. However, if $f_{gh}$ and $$n_{ID}^{RS}$$

are the same as the $f_{gh}$ and $$n_{ID}^{RS}$$

used by another UE, transmissions by the UEs on different DMRS ports will be orthogonal according to the construction of DMRS. e.g., in 3GPP TS 38.211 V16.3.0.

Considering different cyclic shift values v within a same group u, v can be called as to be scrambling IDs for the DMRS used by UE.

So, in general, the different combinations of {u, v} can be interpreted as and thus be called as to be scrambling IDs for the DMRS used by UE when transform precoding is used.

As discussed above, the present disclosure provides solutions for determining the association between one or more SSBs and one or more PUSCH resources for CG based transmission, based on mappings between SSBs and PUSCH resources configured for the CG based transmission. The mappings are defined to be periodic, which is indicated by an association period. The association period is defined as a time period in which all the actually transmitted SSB (identified via SSB indexes) are mapped at least once to respective PUSCH resources.

FIG. 8 illustrates a flowchart of a method 8000 for CG based transmission at a user equipment (e.g. UE), according to some embodiments of the present disclosure. As shown in FIG. 8, the method 8000 comprises determine determining one or more SSBs at block 8001. As shown at block 8002, the method 8000 proceeds to determine one or more PUSCH resources mapped to the determined one or more SSBs in an association period, according to mapping information on mappings between a set of SSBs and a set of PUSCH resources. The association period is a time period in which all SSBs in the set of SSBs are mapped at least once to respective PUSCH resources. Then, as shown at block 8003, the method 8000 proceeds to transmit to a network node, data of the CG based transmission by utilizing the determined one or more PUSCH resources.

Although not shown in FIG. 8, the method 8000 may further comprise: receiving from a network node, a message indicating the association period.

Although not shown in FIG. 8, the method 8000 may further comprise: determining one or more PUSCH resources mapped to the determined one or more SSBs in an association pattern period. The association pattern period includes one or more association periods and is a time period in which a same pattern of mappings between indexes of SSBs in the set SSBs and the set of PUSCH resources repeats across different association pattern periods.

FIG. 9 illustrates a flowchart of a method for CG based transmission at a network node, e.g., a gNB, according to some embodiments of the present disclosure. As shown in FIG. 9, the method 9000 comprises: receiving from a user equipment, data of the CG based transmission in an association period, at block 9001. The association period is a time period in which all SSBs in the set of SSBs are mapped at least once to respective PUSCH resources. As shown at block 9002, the method proceeds to determine one or more PUSCH resources utilized by the CG based transmission. As shown at block 9003, the method proceeds to determine one or more SSBs mapped to the determined one or more PUSCH resources, according to mapping information on mappings between a set of SSBs and a set of PUSCH resources.

In some embodiments, the method 9000 may further comprise: transmitting to the user equipment, a message indicating the association period.

In some embodiments, the method 9000 may further comprise: transmitting to the user equipment, information by utilizing the determined one or more SSBs.

In some embodiments, the method 9000 may further comprise: receiving from the user equipment, data of the CG based transmission in an association pattern period.

In some embodiments, the CG based transmission in the methods 8000 and 9000 may be SDT in RRC_INACTIVE state. It should be appreciated that the CG based transmission can be other kinds of transmission based on CG in other RRC states.

Embodiments of this disclosure can enhance efficiency for CG based transmission, by facilitating beam alignment between the user equipment and the network node accurately and efficiently. For example, without defining the association period, if a network node does not receive any SDT data on a PUSCH resource indicating an associated SSB from a user equipment, the network node cannot determine whether the user equipment does not transmit or fails to transmit the SDT data, or the SDT data would be transmitted later because the SSB is mapped to a PUSCH resource that is ranked behind. It is hard for the network node to determine whether to continue to wait to receive the SDT data. In contrast, based on the association period, it is easy for a network node to make such determination. The network node can determine whether a PUSCH resource indicating an associated SSB is reliably received after one association period, since all transmitted SSBs are mapped at least once to respective PUSCH resources during one association period.

The association period can be defined according to at least one of the following parameters:

a CG period indicating periodicity of PUSCH resources configured by a CG configuration, a number of PUSCH resources per CG period, a number of transmitted SSBs, an SSB transmission period indicating periodicity for transmitting the SSBs, an SSB monitoring period indicating periodicity for monitoring the SSBs, a frequency band and/or subcarrier spacing of PUSCH transmission, and a length of a cyclic prefix of the PUSCH transmission.

The CG period can be also referred to as a period of a CG configuration. FIG. 1 illustrates one CG period configured by one CG configuration. If multiple CG configurations are supported for a UE, then each of the multiple CG configurations may configure respective CG periods. For example, a UE may perform SDT for several applications, and each application may have different requirements. Accordingly, different CG periods can be configured by different CG configurations for SDT according to the different requirements.

In some embodiments, the number of transmitted SSBs may be a maximum number of SSBs supported by a communication system. For example, as shown in FIG. 2, the maximum number of SSBs is 8. In other embodiments, the number of transmitted SSBs may be a number of actually transmitted SSBs, which are a part of the supported SSBs of the communication system. Taking the SSB beam sweeping in FIG. 2 as an example, although up to eight candidate SSBs are supported, a gNB may only actually use four SSBs of the eight SSBs for transmission. In this case, the number of transmitted SSBs is four. In an embodiment, the set of SSBs are the number of SSBs derived from the value of ssb-PositionsInBurst in a message SIB1 or in information element ServingCellConfigCommon.

The SSB transmission period may be defined as 5, 10, 20, 40, 80, or 160 ms. In some embodiment, the transmitted SSBs within an SSB transmission periodicity is confined in 5 ms. For example, as shown in FIG. 2, the eight candidate SSBs is confined in 5 ms.

The SSB monitoring period indicates periodicity for monitoring the SSBs. The SSB monitoring period can be configured to be e.g. longer than the SSB transmission period to reduce UE power consumption.

As described above with reference to FIG. 1, different CG periods are supported depending on the configured subcarrier spacing. The subcarrier spacing may be different for different frequency band.

The cyclic prefix of the PUSCH transmission can be a normal CP or an extended CP. Different length of cyclic prefixes cause different subcarrier spacing.

The present disclosure proposes different methods for determining the association period and the association pattern period, which are needed for supporting multi-beam operation for CG-based SDT. These methods are generic, and they can be applicable for different mapping patterns for mappings between SSBs and CG configured PUSCH resources.

In some embodiments, the association period is a value in a set of candidate values, the set of candidate values is determined by at least a CG period according to a mapping between the CG period and the association period.

In an embodiment, the association period is a smallest value, of time periods during which at least all SSBs in the set of SSBs are mapped at least once to respective PUSCH resources, in the set of candidate values. For example, the association period may start from e.g. frame 0, for mapping SSB indexes to respective CG configured PUSCH resources.

In an embodiment, a maximum value in the set of candidate values is a value of a maximum candidate CG period.

In an embodiment, a minimum value in the set of candidate values is not smaller than a minimum candidate value of the SSB transmission period supported. When the CG period is smaller than the minimum candidate value of the SSB transmission period, the association period is a candidate CG period that is divisible by all candidate CG periods smaller than the minimum candidate value of the SSB transmission period. In an example, values of the candidate CG periods can reuse the candidate CG period values for type 1 and/or type 2 CG configured for normal PUSCH transmission. In other example, one or multiple values of the candidate CG periods can be set specially for CG configured PUSCH transmission for SDT.

For example, the set of candidate values for the association period can be defined in Table 2 below, where values of the candidate CG periods reuse the candidate CG period values for type 1 CG configured PUSCH transmission. The minimum and maximum candidate association period are 5 ms and 640 ms respectively, considering the minimum SSB period is 5 ms and the maximum CG type 1 period in NR release 16 is 640 ms.

TABLE 2

| CG period $T_{cg}$ (ms) | Association period (number of CG periods except when CG period is less than 5 ms) |
|---|---|
| <5 | 20 ms |
| 5 | {1, 2, 4, 8, 16, 32, 64, 128} |
| 8 | {1, 2, 4, 5, 8, 10, 16, 20, 40, 80} |
| 10 | {1, 2, 4, 8, 16, 32, 64} |
| 16 | {1, 2, 4, 5, 8, 10, 20, 40} |
| 20 | {1, 2, 4, 8, 16, 32} |
| 32 | {1, 2, 4, 5, 10, 20} |
| 40 | {1, 2, 4, 8, 16} |
| 64 | {1, 2, 5, 10} |
| 80 | {1, 2, 4, 8} |
| 128 | {1, 5} |
| 160 | {1, 2, 4} |
| 320 | {1, 2} |
| 640 | {1} |

Mapping between a CG period and an association period

As shown in Table 2, a set of candidate values is defined for each CG period (denoted as $T_{cg}$, in milliseconds). For a CG period not less than 5 ms, a value in the set indicates how many CG periods an association period maps to. An integer multiple of the association period may still map to a candidate CG period.

Considering the candidate CG period values for type 1 CG configured PUSCH transmission, when they are smaller than 5 ms, the candidate CG period values can be 0.125, 0.25, 0.5, 0.625, 1, 2, 4 ins, or less than 1 slot (i.e. can be of ½ slot, ½ slot or ⅙ slot), depending on different subcarrier spacings applied which was discussed above with respect to table 1. As such, the minimum candidate CG period value that can be divisible by all these values (i.e. 0.125, 0.25, 0.5, 0.625, 1, 2, 4) is 20 ms.

In another embodiment, a minimum value in the set of candidate values is smaller than the minimum candidate value of the SSB transmission period, and is not smaller than 1 ms. when the CG period is smaller than 1 ms, the association period is a candidate CG period that is divisible by all candidate CG periods smaller than 1 ms. Table 3 shows an example, in which the association period less than 5 ms is allowed, but is no less than 1 ms.

TABLE 3

| CG period $T_{cg}$ (ms) | Association period (number of CG periods except when CG period is less than 1 ms) |
|---|---|
| <1 | 5 ms |
| 1 | {1, 2, 4, 5, 8, 10, 16, 20, 32, 40, 64, 80, 128, 160, 320, 640} |
| 2 | {1, 2, 4, 5, 8, 10, 16, 20, 32, 40, 64, 80, 160, 320} |
| 4 | {1, 2, 4, 5, 8, 10, 16, 20, 32, 40, 80, 160} |
| 5 | {1, 2, 4, 8, 16, 32, 64, 128} |
| 8 | {1, 2, 4, 5, 8, 10, 16, 20, 40, 80} |
| 10 | {1, 2, 4, 8, 16, 32, 64} |
| 16 | {1, 2, 4, 5, 8, 10, 20, 40} |
| 20 | {1, 2, 4, 8, 16, 32} |
| 32 | {1, 2, 4, 5, 10, 20} |
| 40 | {1, 2, 4, 8, 16} |
| 64 | {1, 2, 5, 10} |
| 80 | {1, 2, 4, 8} |
| 128 | {1, 5} |
| 160 | {1, 2, 4} |
| 320 | {1, 2} |
| 640 | {1} |

Mapping between CG period and association period

As shown in Table 3, a set of candidate values is defined for each CG period (denoted as $T_{cg}$, in milliseconds). For a CG period not less than 1 ms, a value in the set indicates how many CG periods an association period maps to. An integer multiple of the association period may still map to a candidate CG period Considering the candidate CG period values for type 1 CG configured PUSCH transmission, when they are smaller than 1 ms, the candidate CG period values can be 0.125, 0.25, 0.5, 0.625 ins, or less than 1 slot (i.e. can be ½ slot, ½ slot or ⅙ slot), depending on different subcarrier spacings (e.g. 15 kHz, 30 kHz, 60 kHz, 120 kHz) and CP length (extended CP or normal CP) applied. As such, the minimum candidate CG period value that can be divisible by these values is 5 ms.

In some embodiments, the association period is an integer multiple of CG periods ($n \times T_{cg}$), where n is an integer number and $T_{cg}$ denotes the configured CG periodicity.

In an embodiment, the integer number n is determined by a function, $f(k)$, that is $n=f(k)$, where k is the smallest integer such that all transmitted SSBs are mapped at least once to the CG PUSCH resources within a period of k CG periods (i.e. the period $k \times T_{cg}$). As an example, if at least 3 CG periods are needed for mapping all transmitted SSBs at least once to the CG PUSCH resources, then, k=3. The association period is $n \times T_{cg}$, where n is determined by $n=f(k)=f(3)$.

There can be different methods for defining the function $f(k)$. In an embodiment, the function $f(k)$ is defined as $f(k)=k$. In an embodiment, the function $f(k)$ is defined as $f(k)=2^{\lceil log_2 k \rceil}$, where $\lceil x \rceil$ represents the ceiling function of x, and it is defined as the smallest integer that is not smaller than x. For example, using this definition, if k=3, then, $f(k)=2^{\lceil log_2 3 \rceil}=4$.

NR supports SSB transmission periodicity of 5, 10, 20, 40, 80 or 160 ms. The transmitted SSBs within an SSB transmission periodicity is confined in 5 ms. In some embodiments, to cover all possible configurations of SSB transmission, and the association period should be defined to be no less than 5 ms, so that all transmitted SSBs can be mapped at least once to the CG resources within an association period.

In some embodiments, the association period is defined to be not smaller than a first threshold (denoted as $T_{min}$). As an example, $T_{min}=5$ ms, within which all transmitted SSBs are confined. As another example, $T_{min}=20$ ms, which is the SSB periodicity assumed for initial access. As another example, $T_{min}$ is an integer multiple of 5 ms.

In an embodiment, the function $f(k)$ is determined so that the integer multiple n of a CG period $T_{cg}$ is not smaller than the first threshold (denoted as $T_{min}$). In an example, the function $f(k)$ is defined as:

if $k \times T_{cg} \geq T_{min}$, $f(k)=k$, otherwise, $$f(k) = \left\lceil \frac{T_{min}}{T_{cg}} \right\rceil \times T_{cg}.$$

In another example, the function $f(k)$ is defined as:

if $2^{\lceil log_2 k \rceil} \times T_{cg} \geq T_{min}$, $f(k)=2^{\lceil log_2 k \rceil}$, otherwise, $$f(k) = 2^{\left\lceil log_2 \left\lceil \frac{T_{min}}{T_{cg}} \right\rceil \right\rceil}.$$

In some embodiments, the association period is not larger than a second threshold, $T_{max}$. As an example, $T_{max}=640$ ms, which is the maximum CG type 1 period configured in NR release 16.

FIG. 10 shows an example of mappings between SSBs and CG configured PUSCH resources, where different SSBs are mapped to different PUSCH occasions per CG period. A PUSCH occasion refers to a resource in domain and/or frequency domain. In this example, one SSB is mapped to a single PUSCH occasion. There are four PUSCH occasions configured per CG period, and the number of transmitted SSBs is four. Therefore, at least one CG period is needed for mapping all transmitted SSBs at least once to the CG PUSCH resources, i.e., k=1.

In this example, using the definition $f(k)=k$ or $f(k)=2^{[log_2 k]}$ gives the same value of $n=f(k)=1$. Assuming that the configured CG period, $T_{cg}$, is larger than $T_{min}$. Then, in this example, the association period is equal to the CG period, $T_{cg}$. The complete set of transmitted SSBs (4 SSBs) are mapped to these four PUSCH occasions within each of the CG period.

Figure 11:
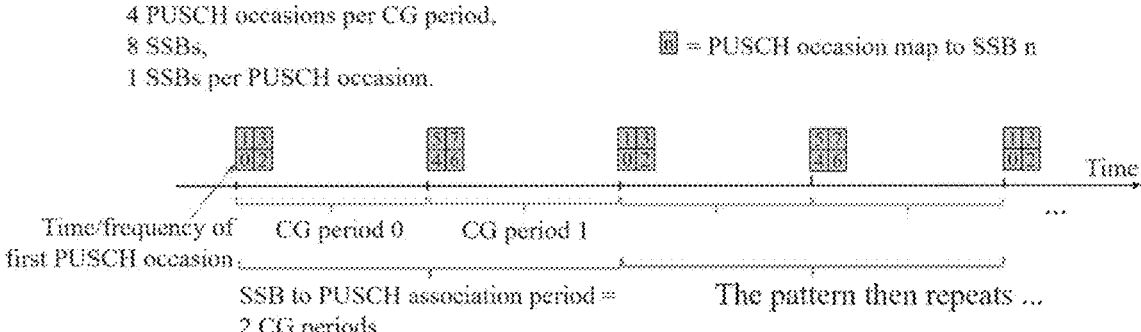
FIG. 11 illustrates an example of mapping different SSBs to different PUSCH occasions across multiple CG periods, according to some embodiments of the present disclosure.

FIG. 11 shows another example of mappings between SSBs and CG configured PUSCH resources, where different SSBs are mapped to different PUSCH occasions across multiple CG periods. In this example, one SSB is mapped to a single PUSCH occasion. There are four PUSCH occasions configured per CG period, and the number of transmitted SSBs is eight. Therefore, at least two CG periods are needed for mapping all transmitted SSBs at least once to the CG PUSCH resources, i.e., k=2.

In this example, using the definition $f(k)=k$ or $f(k)=2^{[log_2 k]}$ gives the same value of $n=f(k)=2$. Assuming that two CG periods, $2 \times T_{cg}$ is larger than $T_{min}$. Then, in this example, the association period is equal to two CG periods, $2 \times T_{cg}$. The complete set of transmitted SSBs (8 SSBs) are mapped to eight PUSCH occasions within each two CG periods.

In some embodiments, the PUSCH resources comprises multiple PUSCH occasions, and mappings between SSBs and the multiple PUSCH resources in the association period is done by consecutively associating M PUSCH occasions to each SSB. That is, the multiple PUSCH occasions in the association period are mapped to each SSB in an order of consecutive PUSCH resource indexes.

The order of consecutive PUSCH resource indexes can be determined according to at least one of the following orders: an order of frequency resource indexes of the respective PUSCH occasions, an order time resource indexes of the respective PUSCH occasions, and an order of CG period indexes within the association period. In an example, as illustrated in FIG. 10 and FIG. 11, the PUSCH occasions are taken in the following order:

First, in an increasing order of frequency resource indexes for frequency multiplexed PUSCH occasions, Second, in an increasing order of time resource indexes for time multiplexed PUSCH occasions within a CG period, Third, in increasing order of CG period indexes within an association period.

In an embodiment, if there is a leftover PUSCH occasion after one or multiple mapping cycles within the association period, no SSBs is mapped to the leftover PUSCH occasion. Here, the mapping cycle means a time duration within which all transmitted SSBs are mapped once to respective PUSCH resources. As an example shown in FIG. 12, four PUSCH occasions are configured per CG period, and 6 SSBs are transmitted in the system. The association period is equal to two CG periods, during which only one mapping cycle is used to map all the 6 SSBs. The last two PUSCH occasions within each association period is not used for SDT transmission.

Figure 12:
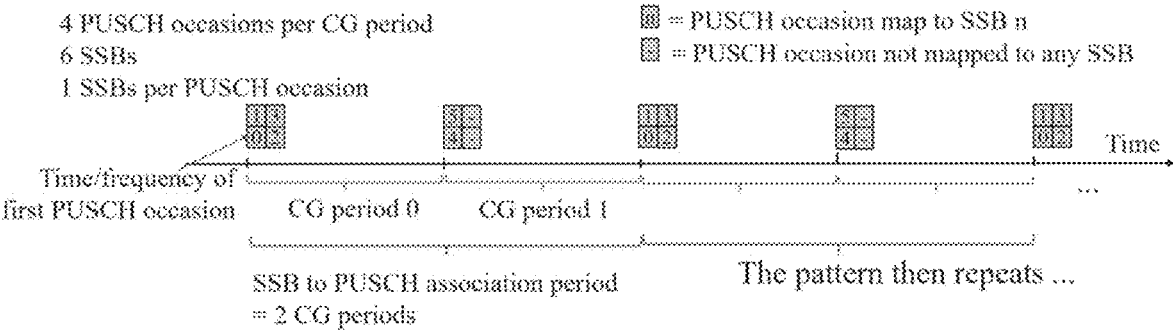
FIG. 12 illustrate an example of mapping different SSBs to different PUSCH occasions across multiple CG periods, with leftover PUSCH occasions, according to some embodiments of the present disclosure.

In some embodiments, only one CG configuration is configured for a user equipment. For example, the exemplary mappings shown in FIGS. 10, 11 and 12 are configured by a single CG configuration for an RRC_INACTIVE UE. Accordingly, the association period is defined for only one CG configuration.

In some embodiments, multiple CG configurations are configured for a user equipment. For example, for an RRC_INACTIVE UE, multiple CG configurations can be configured for supporting different types of services that have different traffic patterns or latency/reliability requirements, if independent mappings between SSBs and CG configured PUSCH resources are applied for each of the CG configurations. In this scenario, the association period can be derived with following embodiments.

In some embodiments, when multiple CG configurations are configured for a UE, an independent association period is defined for each of the multiple CG configurations independently from other CG configurations. The method described in the former part of this section can be used here for deriving the association period for each CG configuration.

When multiple CG configurations are configured for a UE, PUSCH resources configured by different CG configurations may have overlapping PUSCH occasions. In this case, if UL data transmissions for different CG configurations are colliding on the same PUSCH resource, then, the UL data associated to the CG configuration with the highest priority can be transmitted on the PUSCH resource, while the UL data associated to other colliding CG configurations will be discard. There can be cases where the same PUSCH resource is associated to different SSBs for different CG configurations. Therefore, additional information is required by a gNB to determine the SSB associated to the UL data received on this PUSCH resource.

In an embodiment, together with the data of the CG based transmission, additional information about an SSB mapped to the overlapping PUSCH occasion is also transmitted from the UE to the gNB. For example, the additional information may indicate a service type, CG configuration ID of the associated UL data transmission, or an SSB ID. With the additional information, the gNB can determine the SSB associated to this UL data transmission on this overlapping PUSCH occasion.

In an embodiment, which CG configuration that a received CG configured PUSCH resource belongs to can be determined based on one or more of the following:

It is not necessary to differentiate the multiple CG configurations in case that SSB indexes mapped to the overlapping PUSCH occasion in the different CG configurations are the same.

a predetermined index of a CG configuration is determined, where the overlapping PUSCH occasion is mapped to an SSB according to a CG configuration with predetermined index. For example, the predetermined index is the lowest CG configuration index. It means that this overlapping PUSCH occasion is mapped to an SSB according to a CG configuration with the lowest index among the multiple CG configurations.

In an embodiment, the PUSCH resources configured by different CG configurations are always non-overlapping. In this case, there is no ambiguity, and the gNB can obtain the information about the SSB selected by the UE based on the mappings between SSBs to CG configured PUSCH resources for respective CG configurations.

In some embodiments, when multiple CG configurations are configured for a UE, the association period is defined as a common association period, during which all transmitted SSBs are mapped at least once to respective PUSCH resources for each of the multiple CG configurations.

In an embodiment, the common association period is defined as the minimum common multiple of independent association periods of all the multiple CG configurations. An independent association period is an association period defined for an CG configuration independently from other CG configurations.

Figure 13:
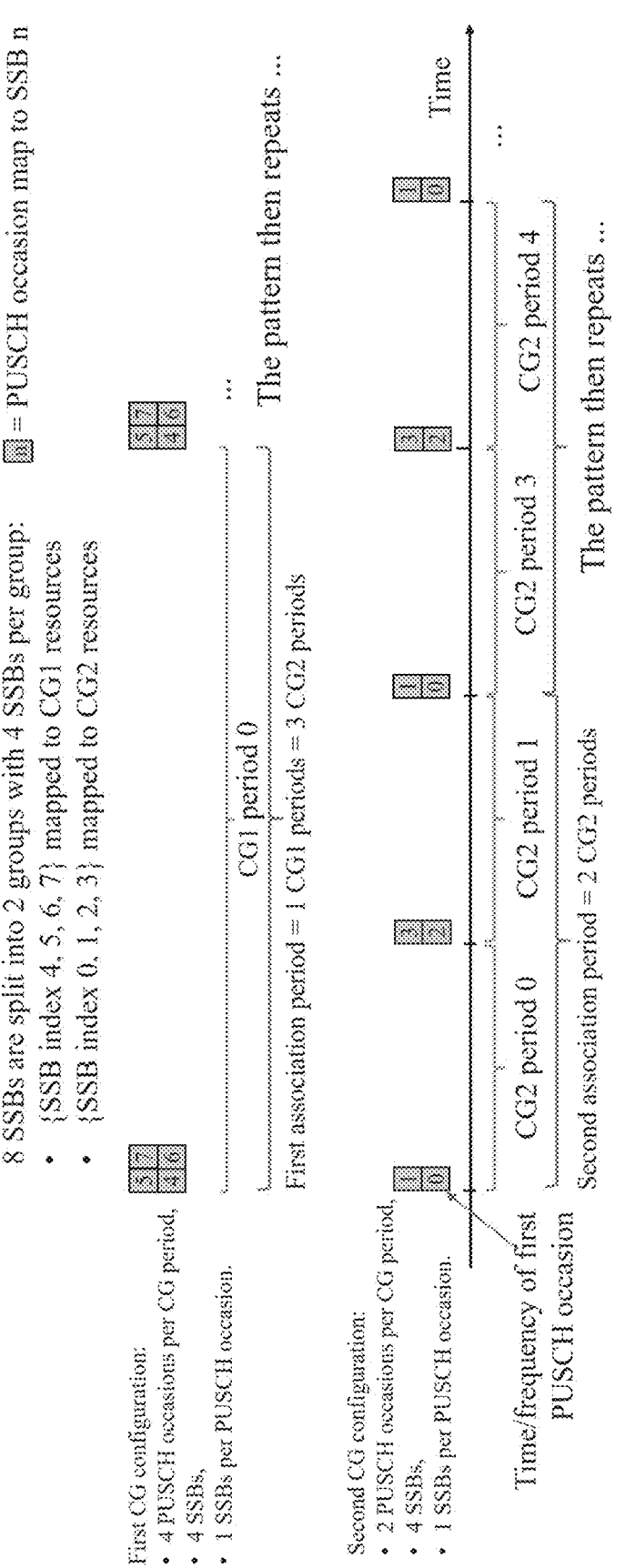
FIG. 13 illustrates an example of mapping different SSBs to different CG configurations, according to some embodiments of the present disclosure.

As an example, shown in FIG. 13, eight SSBs are split into two groups, with four SSBs per group:

{SSB index 4, 5, 6, 7} mapped to a first group of CG resources (referred to as CG1 resources) configured by a first CG configuration with a first CG period (referred to as CG1 period, and denoted as $T_{cg1}$), {SSB index 0, 1, 2, 3} mapped to a second group of CG resources (referred to as CG2 resources) configured by a second CG configuration with a second CG period (referred to as CG1 period, and denoted as $T_{cg2}$), and $T_{cg1}=3T_{cg2}$.

It can be seen that, in this example, an association period for the first CG configuration is $3T_{cg2}$, and the association period for the second CG configuration is $2T_{cg2}$, meaning that the common association period is $6T_{cg2}$.

In another embodiment, when multiple CG configurations are configured for a UE, a common association period is defined as the maximum value among the independent association periods of all the CG configurations.

In the embodiments utilizing a common association period, it is also possible that one or multiple overlapping PUSCH occur. In this case, it can be specified that the overlapped PUSCH occasions will only be mapped to an SSB once.

In some embodiments, an association pattern period of mappings between SSBs and CG configured PUSCH resources are determined. The association pattern period includes one or more association periods, and is a time period in which a same pattern of mappings between indexes of SSBs and PUSCH resources repeats across different association pattern periods. For example, an association pattern period of M milliseconds means that a pattern between CG configured PUSCH resources and SSB indexes would repeat at most every M milliseconds.

In an embodiment, the value of the association pattern period is the maximum CG period, e.g. 640 ms for type 1 CG configured PUSCH transmission.

In an embodiment, in one association pattern period, the CG configured PUSCH resources which are not associated with SSB indexes after an integer number of association periods, if any, are invalidated for being used for CG based transmissions.

In some embodiments, a UE can determine PUSCH resources mapped to the determined SSBs in an association pattern period, and transmit data of the CG based SDT to a gNB on these PUSCH resources, so as to achieve beam alignment between the UE and the gNB more accurately.

In some embodiments, the CG resources configured for SDT UE is considered as released, if the UE does not transmit UL data in a number of consecutive association periods or a number of consecutive association pattern periods. With this method, the released resources can be used for other UL transmission purposes. The number can be a predetermined value or configured by a network node, e.g. via an RRC signaling in RRC release message.

In some embodiments, a UE can switch to RACH based SDT after a number of consecutive association periods or after a number of consecutive association pattern periods. The number can be a predetermined value or configured by a network node, e.g. via an RRC signaling in RRC release message. For example, the UE can switch to RACH based SDT after the number of consecutive association periods or association pattern periods, for one or more of the following cases: it fails transmitting SDT with the resources configured during these periods, and the resources are assumed to be released since there's no SDT transmission during these periods.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 14:
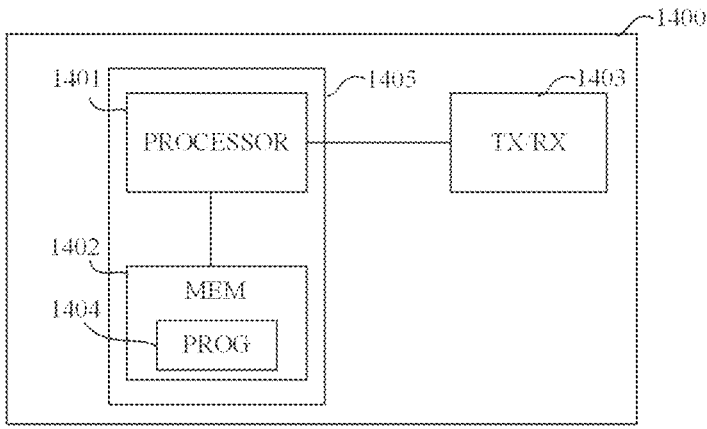
FIG. 14 is a block diagram illustrating an apparatus according to some embodiments of the present disclosure.

FIG. 14 illustrates a simplified block diagram of an apparatus 1400 that may be embodied in/as a terminal device (e.g., a UE), or a network node (e.g., a gNB). The apparatus 1400 may comprise at least one processor 1401, such as a data processor (DP) and at least one memory (MEM) 1402 coupled to the processor 1401. The apparatus 1400 may further comprise a transmitter TX and receiver RX 1403 coupled to the processor 1401. The MEM 1402 stores a program (PROG) 1404. The PROG 1404 may include instructions that, when executed on the associated processor 1401, enable the apparatus 1400 to operate in accordance with the embodiments of the present disclosure, for example to perform one of the methods 8000, 9000. A combination of the at least one processor 1401 and the at least one MEM 1402 may form processing means 1405 adapted to implement various embodiments of the present disclosure.

Various embodiments of the present disclosure may be implemented by computer program executable by one or more of the processors 1401, software, firmware, hardware or in a combination thereof.

The MEMs 1402 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1401 may be of any type suitable to the local technical environment, and may include one or more of general purpose computers, special purpose computers, microprocessors, digital signal processors DSPs and processors based on multicore processor architecture, as non-limiting examples.

Figure 15:
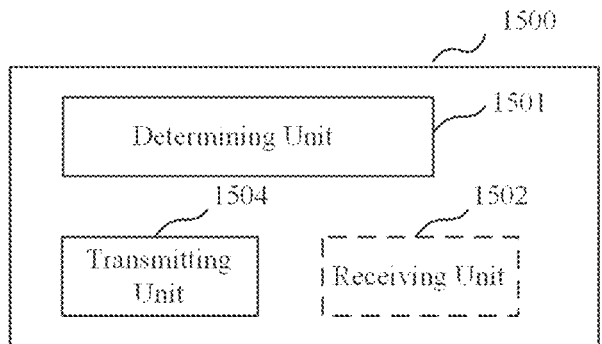
FIG. 15 are block diagrams illustrating apparatus according to some embodiments of the present disclosure.

Reference is now made to FIG. 15, which illustrates a schematic block diagram of apparatus 1500 in a terminal device, such as a UE. The apparatus 1500 is operable to carry out the exemplary methods 8000 described with reference to FIG. 8, and possibly any other processes or methods.

As shown in FIG. 15, the apparatus 1500 may comprise: a determining unit 1501, which is configured to determine one or more synchronization signal and physical broadcast channel blocks (SSBs); and to determine one or more PUSCH resources mapped to the determined one or more SSBs in an association period, according to mapping information on mappings between a set of SSBs and a set of PUSCH resources, wherein the association period is a time period in which all SSBs in the set of SSBs are mapped at least once to respective PUSCH resources. The apparatus 1500 further comprises a transmitting unit 1504, which is configured to transmit to a network node, data of the CG based transmission by utilizing the determined one or more PUSCH resources.

In some embodiments, the apparatus 1500 may further comprise a receiving unit 1502, which is configured to receive from a network node, a message indicating the association period.

In some embodiments, the determining unit 1501 may be further configured to determine one or more PUSCH resources mapped to the determined one or more SSBs in an association pattern period. The association pattern period includes one or more association periods and is a time period in which a same pattern of mappings between indexes of SSBs in the set SSBs and the set of PUSCH resources repeats across different association pattern periods.

Figure 16:
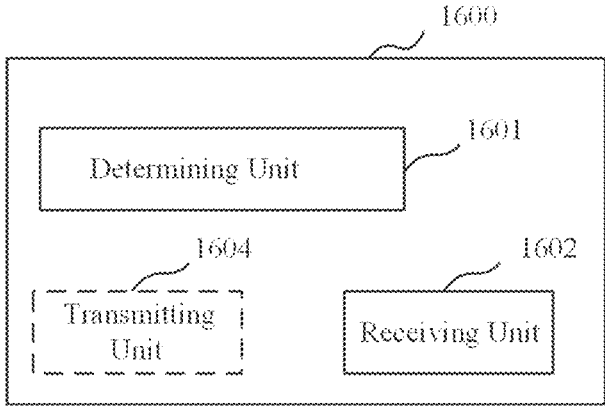
FIG. 16 are block diagram illustrating apparatus according to some embodiments of the present disclosure.

Reference is now made to FIG. 16, which illustrates a schematic block diagram of apparatus 1600 in a network node in a wireless communication network, such as a gNB. The apparatus 1600 is operable to carry out the exemplary method 9000 described with reference to FIG. 9, respectively, and possibly any other processes or methods.

As illustrated in FIG. 16, the apparatus 1600 comprises a receiving unit 1602, which is configured to receive from a user equipment, data of the CG based transmission in an association period, wherein the association period is a time period in which all SSBs in the set of SSBs are mapped at least once to respective PUSCH resources. The apparatus 1600 further comprises a determining unit 1601, which is configured to determine one or more PUSCH resources utilized by the CG based transmission; and to determine one or more SSBs mapped to the determined one or more PUSCH resources, according to mapping information on mappings between a set of SSBs and a set of PUSCH resources.

In some embodiments, the apparatus 1600 may further comprise a transmitting unit 1604, which is configured to transmit to the user equipment, a message indicating the association period.

In some embodiments, the apparatus 1600 may further comprise a transmitting unit 1604, which is configured to transmit to the user equipment, information by utilizing the determined one or more SSBs.

In some embodiments, the receiving unit 1602 may be further configured to receive from the user equipment, data of the CG based transmission in an association pattern period.

Figure 17:
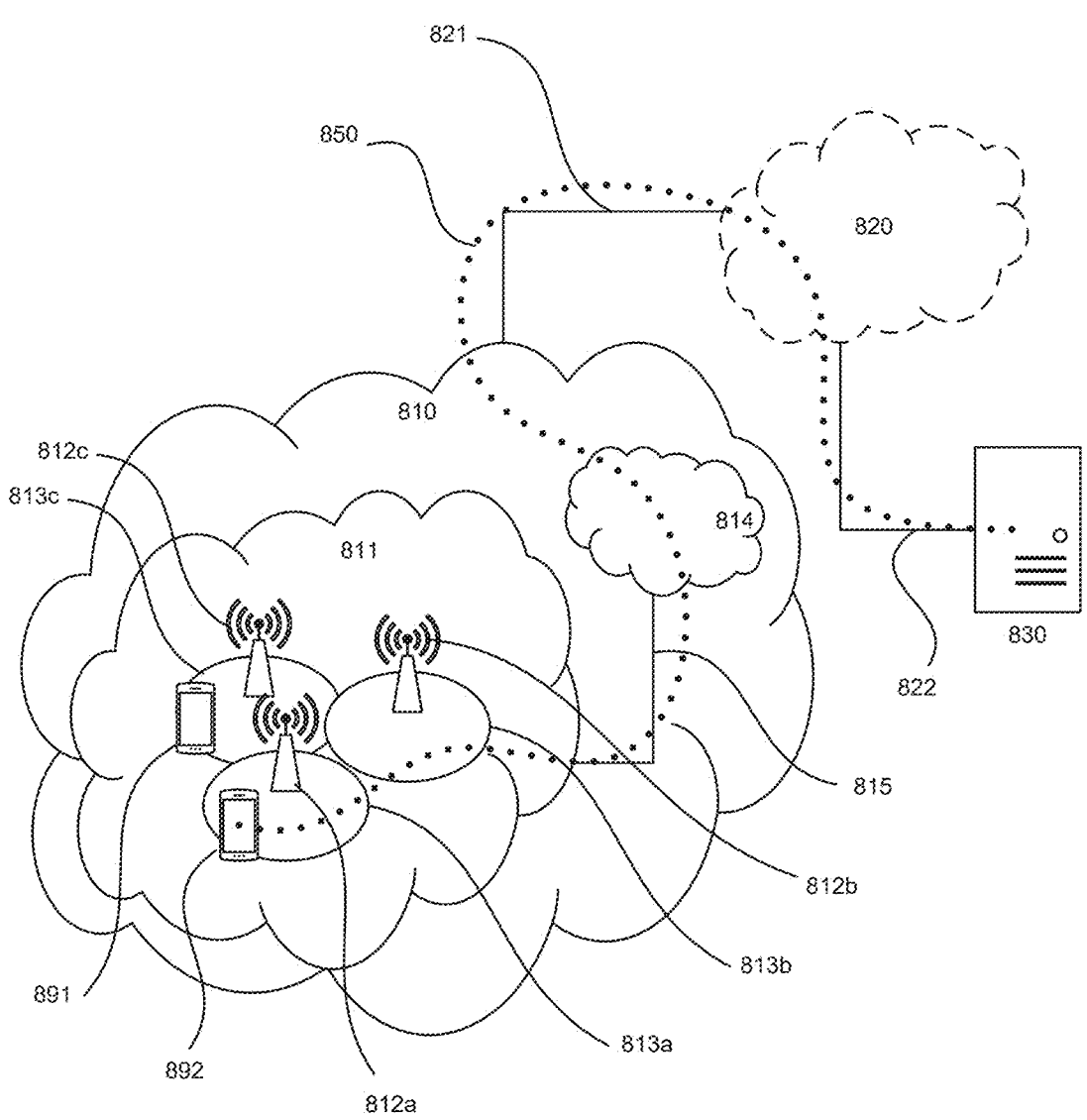
FIG. 17 is a block diagram illustrating a telecommunication network connected via an intermediate network to a host computer in accordance with some embodiments of the present disclosure.

FIG. 17 is a block diagram illustrating a telecommunication network connected via an intermediate network to a host computer in accordance with some embodiments of the present disclosure.

With reference to FIG. 17, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 891 located in a coverage area 813c is configured to wirelessly connect to, or be paged by, the corresponding base station 812c. A second UE 892 in a coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 17 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 18:
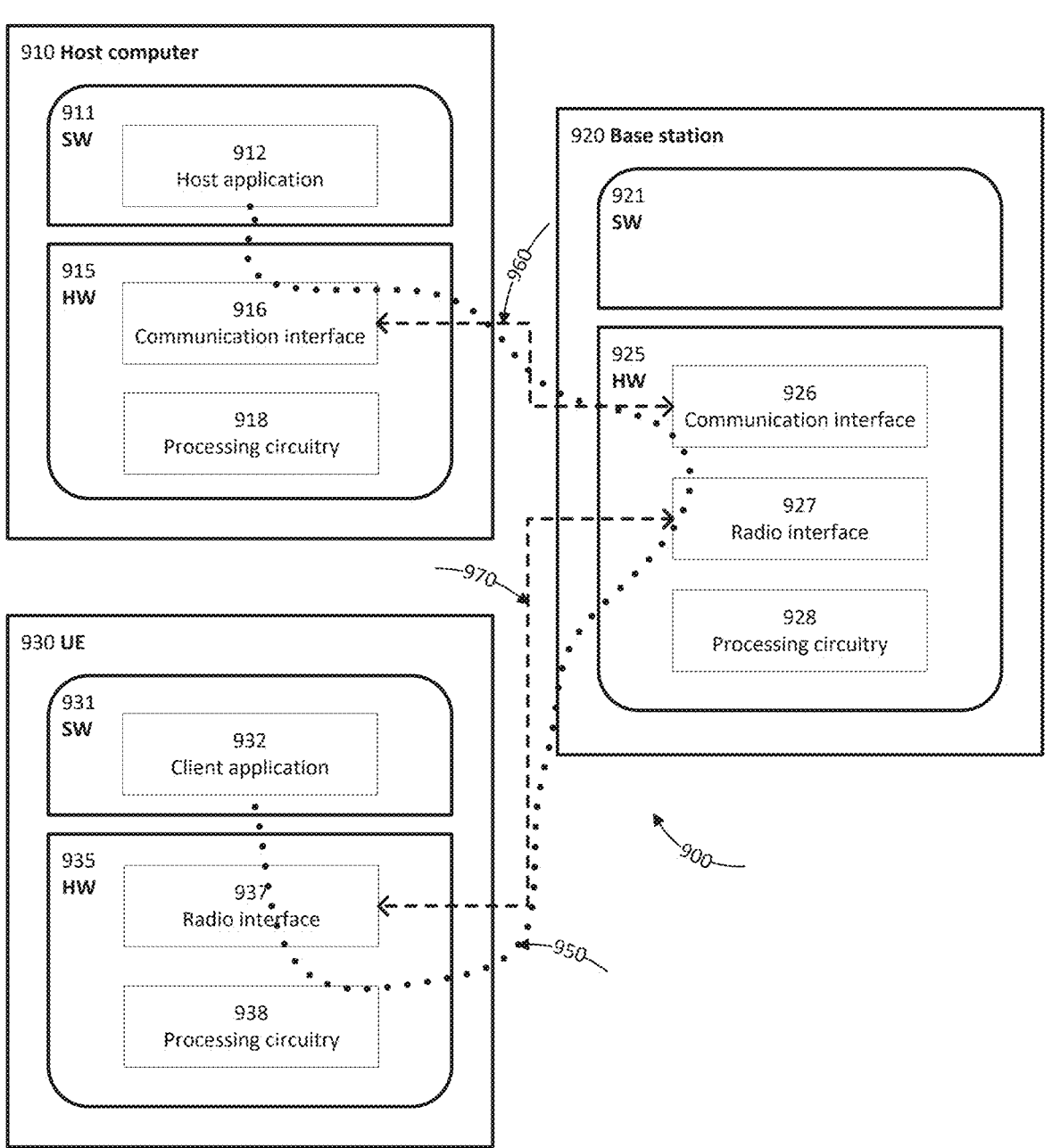
FIG. 18 is a block diagram illustrating a host computer communicating via a base station with a UE over a partially wireless connection in accordance with some embodiments of the present disclosure.

FIG. 18 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 18. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 18) served by the base station 920. The communication interface 926 may be configured to facilitate a connection 960 to the host computer 910. The connection 960 may be direct or it may pass through a core network (not shown in FIG. 18) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 18 may be similar or identical to the host computer 830, one of base stations 812a, 812b, 812c and one of UEs 891, 892 of FIG. 17, respectively. This is to say, the inner workings of these entities may be as shown in FIG. 18 and independently, the surrounding network topology may be that of FIG. 17.

In FIG. 18, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 19:
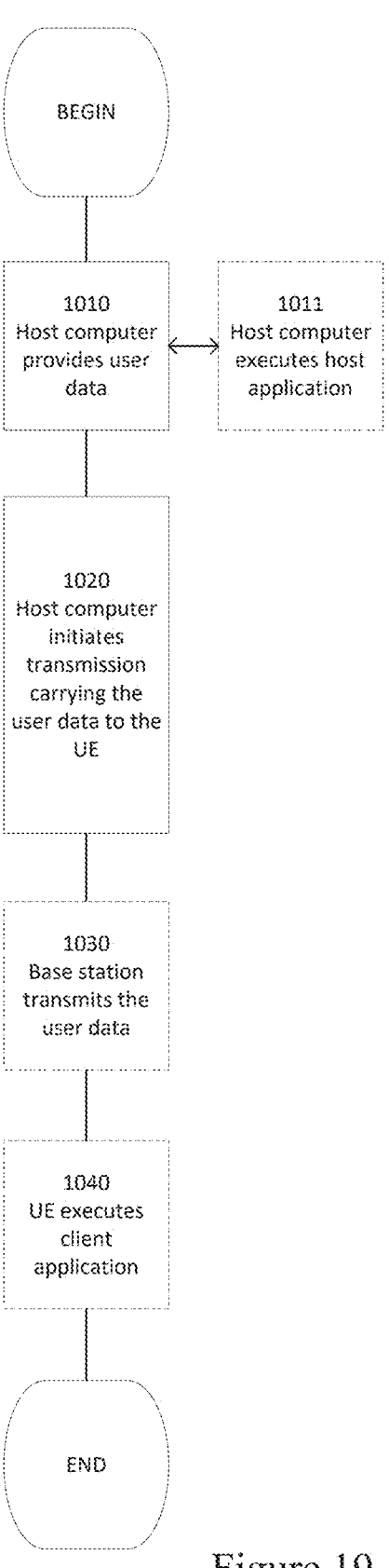
FIG. 19 is a flowchart illustrating a method implemented in a communication system, in accordance with an embodiment of the present disclosure.

FIG. 19 is a flowchart illustrating a method implemented in a communication system, in accordance with an embodiment. The communication system includes a host computer, a base station and a UE which may be those described with reference to FIG. 17 and FIG. 18. For simplicity of the present disclosure, only drawing references to FIG. 19 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 20:
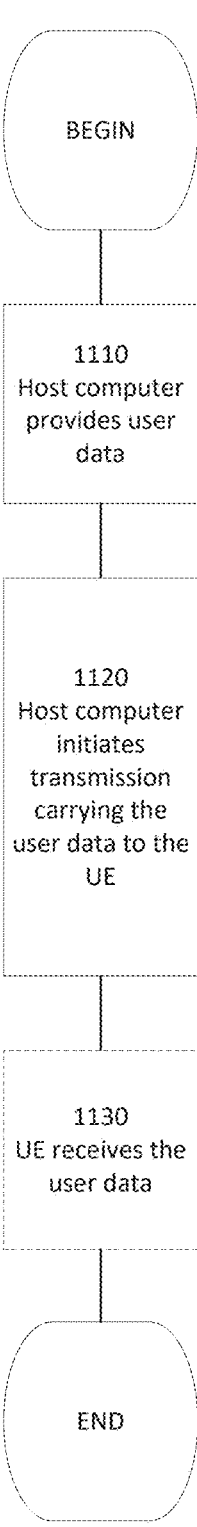
FIG. 20 is a flowchart illustrating a method implemented in a communication system, in accordance with an embodiment of the present disclosure.

FIG. 20 is a flowchart illustrating a method implemented in a communication system, in accordance with an embodiment. The communication system includes a host computer, a base station and a UE which may be those described with reference to FIG. 17 and FIG. 18. For simplicity of the present disclosure, only drawing references to FIG. 20 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 21:
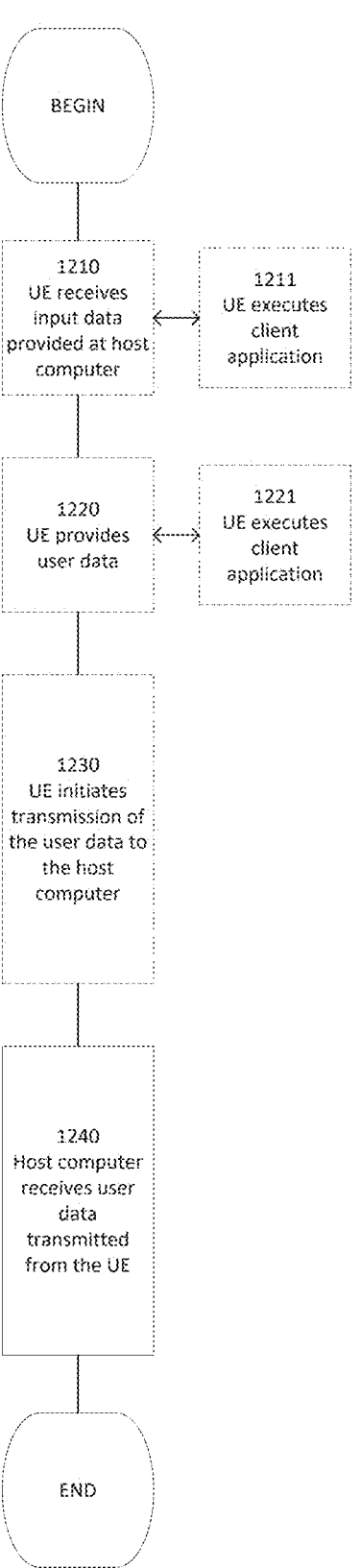
FIG. 21 is a flowchart illustrating a method implemented in a communication system, in accordance with an embodiment of the present disclosure.

FIG. 21 is a flowchart illustrating a method implemented in a communication system, in accordance with an embodiment. The communication system includes a host computer, a base station and a UE which may be those described with reference to FIG. 17 and FIG. 18. For simplicity of the present disclosure, only drawing references to FIG. 21 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 22:
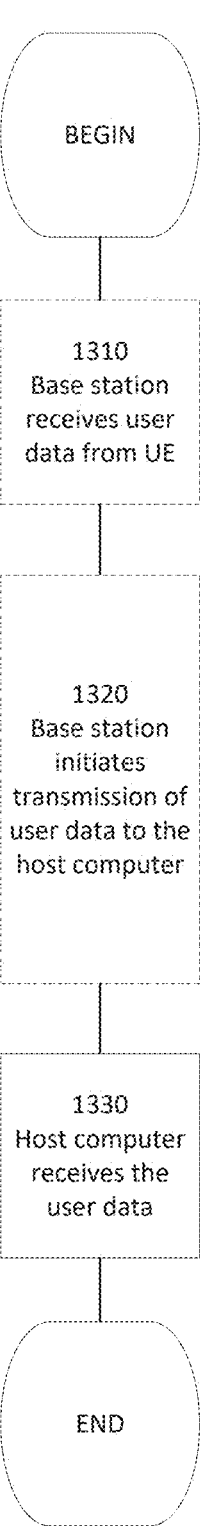
FIG. 22 is a flowchart illustrating a method implemented in a communication system, in accordance with an embodiment of the present disclosure.

FIG. 22 is a flowchart illustrating a method implemented in a communication system, in accordance with an embodiment. The communication system includes a host computer, a base station and a UE which may be those described with reference to FIG. 17 and FIG. 18. For simplicity of the present disclosure, only drawing references to FIG. 22 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method for configured grant (CG) based transmission at a user equipment in a communication system, the method comprising:

determining one or more synchronization signal and physical broadcast channel blocks (SSBs);

determining one or more physical uplink shared channel (PUSCH) resources mapped to the determined one or more SSBs in an association period, according to mapping information on mappings between a set of SSBs and a set of PUSCH resources; and transmitting to a network node, data of the CG based transmission by utilizing the determined one or more PUSCH resources, wherein the association period is a time period in which all SSBs in the set of SSBs are mapped at least once to respective PUSCH resources and the association period is a value in a set of candidate values, the set of candidate values is determined by at least a CG period according to a mapping between the CG period and the association period, wherein the association period is a smallest value, during which at least all SSBs in the set of SSBs are mapped at least once to respective PUSCH resources, in the set of candidate values of time periods, wherein a maximum value in the set of candidate values is a value of a maximum candidate CG period.

2. The method according to claim 1, further comprising: receiving from a network node, a message indicating the association period;

wherein the association period is defined according to at least one of the following parameters:

a CG period indicating periodicity of PUSCH resources configured by a CG configuration, a number of PUSCH resources per CG period, a number of SSBs in the set of SSBs, an SSB transmission period indicating periodicity for transmitting the set of SSBs, an SSB monitoring period indicating periodicity for monitoring the set of SSBs, a frequency band and/or subcarrier spacing of PUSCH transmission, and a length of a cyclic prefix of the PUSCH transmission.

3. The method according to claim 1, wherein a minimum value in the set of candidate values is not smaller than a minimum candidate value of the SSB transmission period supported by the communication system.

4. The method according to claim 1, wherein when the CG period is smaller than the minimum candidate value of the SSB transmission period, the association period is a candidate CG period that is divisible by all candidate CG periods smaller than the minimum candidate value of the SSB transmission period.

5. The method according to claim 1, wherein the association period is an integer multiple n of a CG period $T_{cg}$, wherein the association period is not larger than a threshold.

6. The method according to claim 5, wherein the integer multiple n is determined by a function of an integer k, $f(k)$, such that k is a smallest integer, and all SSBs in the set of SSBs are mapped at least once to respective PUSCH resources within a period of k CG periods.

7. The method according to claim 6, wherein the function $f(k)$ is determined such that the integer multiple n of a CG period $T_{cg}$ is not smaller than a first threshold $T_{min}$.

8. The method according to claim 1, wherein the set of PUSCH resources comprises multiple PUSCH occasions, and mappings between the set of SSBs and the set of PUSCH resources in the association period is done by associating the multiple PUSCH occasions in the association period to each SSB in the set of SSBs in an order of consecutive PUSCH resource indexes.

9. The method according to claim 8, wherein the order of consecutive PUSCH resource indexes is determined according to at least one of the following orders:

an order of frequency resource indexes of the respective PUSCH occasions, an order time resource indexes of the respective PUSCH occasions within a CG period, and an order of CG period indexes within the association period.

10. The method according to claim 8, wherein if there is a leftover PUSCH occasion after one or multiple mapping cycles within the association period, no SSBs are mapped to the leftover PUSCH occasion, wherein the mapping cycle is a time duration within which all SSBs in the set of SSBs are mapped once to respective PUSCH resources.

11. The method according to claim 1, wherein multiple CG configurations are configured for the user equipment, an independent association period is defined for each of the multiple CG configurations independently from other CG configurations; or wherein multiple CG configurations are configured for the user equipment, the association period is defined as a common association period, during which all SSBs in the set of SSBs are mapped at least once to respective PUSCH resources for each of the multiple CG configurations.

12. The method according to claim 1, wherein PUSCH resources configured by different CG configurations are non-overlapping.

13. The method according to claim 1, further comprising: determining one or more PUSCH resources mapped to the determined one or more SSBs in an association pattern period, wherein the association pattern period includes one or more association periods and is a time period in which a same pattern of mappings between indexes of SSBs in the set SSBs and the set of PUSCH resources repeats across different association pattern periods.

14. The method according to claim 13, wherein the association pattern period is a maximum candidate CG period.

15. The method according to claim 14, further comprising:

invalidating a PUSCH resource that is not mapped to any SSBs after an integer number of association periods in an association pattern period.

16. The method according to claim 1, further comprising: determining to release PUSCH resources configured for the CG based transmission, in case that there is no CG based transmission for a number of consecutive association periods or a number of consecutive association pattern periods.

17. The method according to claim 1, further comprising: switching to random access channel (RACH) based transmission after a number of consecutive association periods or a number of consecutive association pattern periods.

18. The method according to claim 1, wherein the set of SSBs are the number of SSBs derived from the value of ssb-PositionsInBurst in a message SIB1 or in information element ServingCellConfigCommon, wherein the CG based transmission is a CG-based small data transmission.

19. An apparatus for configured grant (CG) based transmission at a user equipment, the apparatus comprising: one or more processors; and one or more memories comprising computer program codes, the one or more memories and the computer program codes configured to, with the one or more processors, cause the apparatus to:

determine one or more synchronization signal and physical broadcast channel blocks (SSBs);

determine one or more physical uplink shared channel (PUSCH) resources mapped to the determined one or more SSBs in an association period, according to mapping information on mappings between a set of SSBs and a set of PUSCH resources; and transmit to a network node, data of the CG based transmission by utilizing the determined one or more PUSCH resources, wherein the association period is a time period in which all SSBs in the set of SSBs are mapped at least once to respective PUSCH resources, and the association period is a value in a set of candidate values, the set of candidate values is determined by at least a CG period according to a mapping between the CG period and the association period, wherein the association period is a smallest value, during which at least all SSBs in the set of SSBs are mapped at least once to respective PUSCH resources, in the set of candidate values of time periods, wherein a maximum value in the set of candidate values is a value of a maximum candidate CG period.

*    *    *    *    *